(12) United States Patent
Bartholomew et al.

(10) Patent No.: US 11,089,352 B1
(45) Date of Patent: Aug. 10, 2021

(54) TECHNIQUES FOR SYNCHRONIZING CONTENT PLAYBACK ACROSS DEVICES

(71) Applicant: Amazon Technologies, Inc., Seattle, WA (US)

(72) Inventors: Michael James Bartholomew, Seattle, WA (US); Paul Martin, Seattle, WA (US); Steve Huynh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 81 days.

(21) Appl. No.: 16/259,881

(22) Filed: Jan. 28, 2019

(51) Int. Cl.
| | |
|---|---|
| *H04N 21/43* | (2011.01) |
| *H04N 21/242* | (2011.01) |
| *H04L 29/06* | (2006.01) |
| *H04N 21/2387* | (2011.01) |

(52) U.S. Cl.
CPC ..... *H04N 21/4307* (2013.01); *H04L 65/4084* (2013.01); *H04L 65/80* (2013.01); *H04N 21/2387* (2013.01); *H04N 21/242* (2013.01)

(58) Field of Classification Search
CPC ............. H04N 21/4307; H04N 21/242; H04N 21/2387; H04L 65/80; H04L 65/4084
See application file for complete search history.

(56) References Cited

U.S. PATENT DOCUMENTS

| | | | |
|---|---|---|---|
| 10,536,741 B1* | 1/2020 | Madison | ............ H04N 21/4307 |
| 2009/0106357 A1* | 4/2009 | Igelman | ................ H04L 65/608 |
| | | | 709/203 |
| 2009/0205008 A1* | 8/2009 | Wollmershauser | .......................... |
| | | | H04N 21/44008 |
| | | | 725/131 |
| 2013/0067116 A1* | 3/2013 | Ostergren | .......... H04N 21/4788 |
| | | | 709/248 |
| 2014/0344854 A1* | 11/2014 | Kanojia | ......... H04N 21/440236 |
| | | | 725/34 |
| 2015/0095512 A1* | 4/2015 | Ali | ..................... H04N 21/4305 |
| | | | 709/231 |
| 2016/0044622 A1* | 2/2016 | Crowe | ................. H04N 21/658 |
| | | | 709/231 |
| 2016/0105500 A1* | 4/2016 | Anchan | ............... H04L 67/1051 |
| | | | 370/329 |

\* cited by examiner

*Primary Examiner* — Nicholas R Taylor
*Assistant Examiner* — Sanjoy Roy
(74) *Attorney, Agent, or Firm* — Kilpatrick Townsend & Stockton LLP

(57) ABSTRACT

Systems and methods are provided herein for synchronizing content across multiple user devices. Content packets may be individually provided to user devices associated with a group. Each content packet may include a portion of content (e.g., media content) and a content index (e.g., an index that indicates a sequence by which the content packets are to be presented). The user device may begin to play the content packets according to the sequence. The user device may receive a particular content index identifying a particular content packet that occurs latest in the sequence and that has been received by all of the devices of the group. The user device may modify playback of the content packets based at least in part on the particular content index to synchronize playback of the content at the user device with respect to playback at the one or more devices.

20 Claims, 9 Drawing Sheets

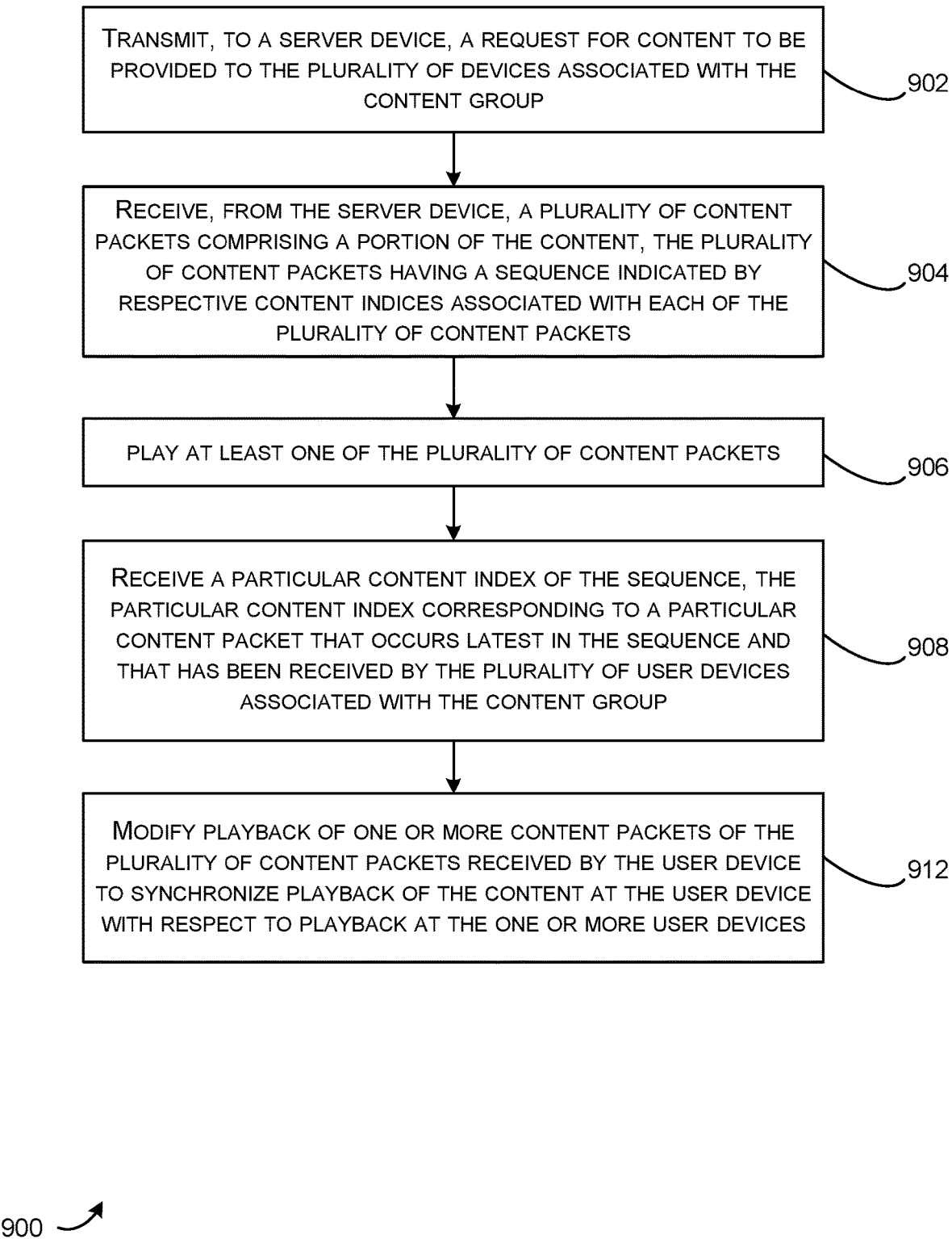

TECHNIQUES FOR SYNCHRONIZING CONTENT PLAYBACK ACROSS DEVICES

BACKGROUND

Data streaming is a technology used most often to deliver content to computers and mobile devices over the Internet. A computing device transmits data (e.g., audio and/or video data) as a continuous flow, which allows recipients to begin watching and/or listening to the received data almost immediately without requiring all of the content to be downloaded onto a client device first. By way of example, a client device (e.g., a laptop, mobile phone, desktop computer, etc.) can be used to play an audio stream that allows a user to listen to an event happening in real time (e.g., a television episode, a movie, etc.).

As clients are streaming such content, it is possible that the media stream may be delayed due to various factors (e.g., the processing capabilities of the client device, transmission speeds of the client's Internet connection, general Internet transmission delays, buffering times, distance, etc.). This delay can vary between client devices that may each be playing the same media stream.

BRIEF DESCRIPTION OF THE DRAWINGS

Various embodiments in accordance with the present disclosure will be described with reference to the drawings, in which:

FIG. 9 is a flowchart illustrating another example method for synchronizing content utilizing the synchronization engine, in accordance with at least one embodiment.

DETAILED DESCRIPTION

Figure 1:
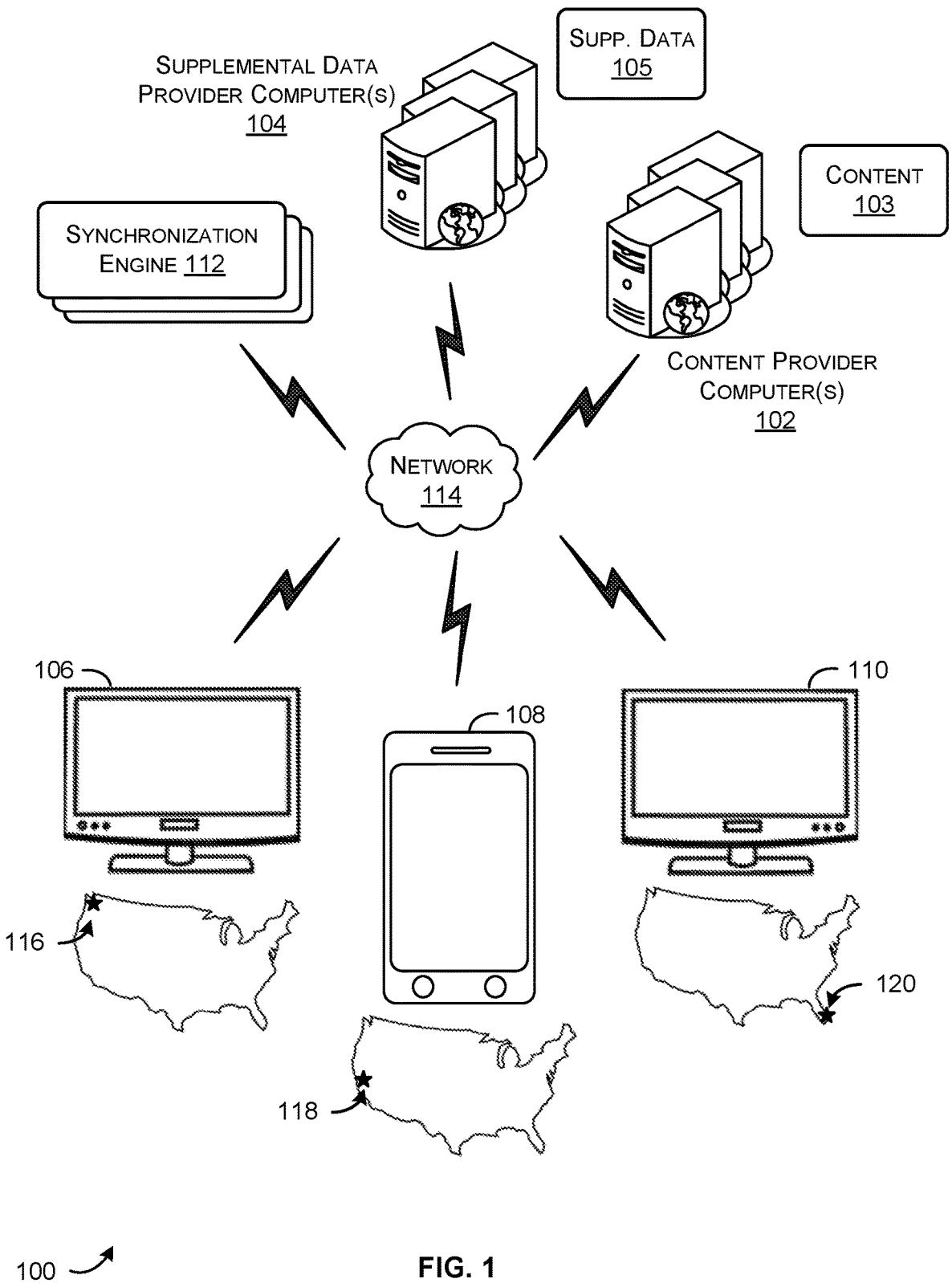
FIG. 1 is a schematic diagram illustrating an example environment suitable for implementing aspects of a synchronization engine, in accordance with at least one embodiment.

Techniques described herein are directed to a synchronization engine for synchronizing content. "Content" may include any suitable media data (e.g., a movie, a song, a television show, a podcast, video, audio, etc.). In some embodiments, content may be delivered to a user device utilizing streaming technology. "Supplemental data," as used herein, may include metadata in any suitable format (e.g., text, images, video, audio, a voice call, a video chat, etc.).

Conventionally, should two users desire to watch a television show together utilizing their respective user devices (e.g., laptops, smartphones, televisions, etc.), each user may need to access the television show individually. To start their viewing experience, the users may coordinate amongst themselves to start the content approximately at the same time (e.g., each user hits "play" at approximately the same time). As the content is streamed to each respective device, the respective playback may be delayed due to various factors (e.g., the processing capabilities of the user device, download speeds of the Internet connection utilized by the user device, general Internet transmission delays, buffering times, distance, etc.).

By way of example, Steve in Seattle may want to watch a football game with his Grandfather, Robert, in Miami. Robert may utilize an Internet connection with a relatively slow download speed (e.g., 3 Mbps) and an older television with a relatively slow processor, while Steve may utilize an Internet connection with a relatively fast download speed (e.g., 20 Mbps) and a television set with a relatively fast processor. Steve and Robert may communicate verbally via a telephone call as they watch the game. While the two men might be able to start watching the game at approximately the same time (e.g., by accessing the content and hitting "play" at approximately the same time), their viewing experiences may quickly diverge. Due to the relative capabilities of the viewing devices and the relative Internet speeds, Robert's viewing might lag behind Steve's. As a touchdown is made, Robert's viewing experience may be negatively affected as Steve may yell out "touchdown!!" prior to the touchdown being presented on Robert's device. Techniques discussed herein are directed to synchronizing media content across devices to ensure that each viewer is presented only the portions of content that are currently available for presentation at the other viewer's device.

As a non-limiting example, a user, operating a user device such as a mobile phone, may access media content via an application operating on the client device (e.g., a browsing application, a streaming application, etc.) to create a group or join a previously created group. By way of example, Steve may access an interface of an application to specify that he wants to watch content with Robert. In some embodiments, Steve may provide contact information (e.g., a phone number, an email address, etc.) associated with Robert. A group identifier may be generated and a group code and/or invitation may be generated for the group. Steve may communicate the group code to Robert and/or an invitation including the group code may be sent to Robert automatically utilizing the contact information provided. The invitation could alternatively include a hyperlink that, upon selection, may navigate Robert to a network page associated with the group.

At any suitable time (e.g., prior to group creation, subsequent to group creation), a user device associated with the group may utilize the application to browse for content (e.g., a movie). This content may be provided as part of an electronic catalog hosted by a content provider computer. Content may be selected via the application and this selection may cause a synchronization engine (e.g., a component of the application or a standalone engine operating on the user device) to begin receiving a stream of data (e.g., content packets each including a portion of the content) corresponding to the movie from the content provider computer.

Any one of the users may utilize an interface element (e.g., a play button) provided by the application to begin playback of the content. In some embodiments, the content is streamed by a content provider computer and/or other user devices of the group. Each synchronization engine (e.g., a component of the respective applications or one or more standalone engines) may cause the content to be provided via respective displays and/or speakers of the respective user devices. The synchronization engine may further be configured to receive supplemental data in the form of voice/audio and/or video data such that the users of the group may communicate with one another as they watch the content. For example, the supplemental data may be associated with a video chat that may be initiated from the group interface. The application may provide one or more interfaces for displaying the supplemental data along with the content (e.g., via the group interface, via separate interface elements such as an embedded window overlaid over the content being viewed). In some embodiments, a portion of the supplemental data (e.g., video of the other user) may be hidden while content is played, while a different portion (e.g., audio of the users) may be presented with the content.

Continuing with the example above, as the content is played (with or without supplemental data being presented), the synchronization engine on each device may be configured to periodically transmit an indicator of the data received. As a non-limiting example, the synchronization engine may be configured to transmit (e.g., upon receipt, or another suitable time) a content index (e.g., packet number, message number, run time, etc.) associated with a content packet received. For example, in the scenario that the content is divided into 1000 content packets that are sequentially streamed to each user device over time, the synchronization engine may be configured to transmit an indicator indicating that packet 1 was received, packet 2 was received, packet 3 was received, and so on. In some embodiments in which multiple content packets may be received in a single message, the synchronization engine may transmit an indicator of the last packet received. Any data exchanged between the synchronization engine and the content provider computer may further include a unique group identifier and/or a user device identifier such that the data may be identifiable as pertaining to the group and/or a particular user device.

The content provider computer may receive these transmissions from each user device of the group. Upon receipt, or at any suitable time, the content provider computer may be configured to determine a particular content index corresponding to a particular content packet that occurs latest in the sequence that has also been received by each user device in the group. Continuing with the ongoing example, the content provider computer may receive an indication that user device A's last received packet was "6", user device B's last received packet was "8," and user device C's last received packet was "4." Accordingly, the content provider computer may be configured to determine that packet "4" was the latest packet in the sequence that has been received by all user devices in the group (e.g., user devices A-C). The content provider computer may transmit to each of the user devices a content index value that indicates that "4" was the last packet received by all of the user devices in the group.

The synchronization engine, operating at each user device, may be configured to receive this content index value. The synchronization engine may be configured to ensure that packets occurring in the content after the index indicated by the content index value are not immediately played at the user device. For example, the synchronization engine operating at user device A may ensure that packets 5 and 6 are not played. Similarly, the synchronization engine operating at user device B may ensure that packets 5-8 are not played. In some scenarios, this may result in pausing the media content playback at the user device A and user device B while user device C catches up. In some embodiments, the synchronization engine may cause a notification to be displayed at user devices A and B indicating a cause for the delay (e.g., "synchronizing, please wait"). By way of example, the applications of user devices A and B may individually display an indication that the media stream is delayed due to a condition experienced at user device C (e.g., "Grandpa's connection and/or device is causing a delay," "synchronizing with Grandpa," etc.).

Subsequently, user device A may receive packets 7 and 8, user device B may receive packets 9 and 10, and user device C may receive packets 5-8. Each device may once again transmit any suitable number of receipt indications to the content provider computer indicating a last packet received. The content provider computer may in turn transmit a new content index value (e.g., "8") to each device. Each synchronization engine may utilize the newly received content index to ensure that a corresponding application may resume playing the media content, at least through portion of content corresponding to packet 8. This process may be repeated any suitable number of times to insure that no application plays content that hasn't been received by all of the devices in the group. Utilizing these techniques, the media content playback may be synchronized across devices such that the viewing experience is enhanced.

In some embodiments, the synchronization engine and/or the content provider computer may be configured to determine that a particular user device (e.g., user device C) has lagged behind the group over a threshold number of times and/or by a threshold data amount. In some embodiments, this may cause the synchronization engine/application to request and/or the content provider computer to provide the content in a different format. As a non-limiting example, while user device C may be capable of displaying (and may initially provide) the content in a relatively high resolution format (e.g., high definition (HD), 4K resolution, etc.), due to consistent lagging, the media content may eventually be provided in a lower resolution format (e.g., standard definition (SD)). Thus, user device C's content quality may be purposefully degraded in order to cause user device C to receive and/or process data packets quicker such that synchronization with user devices A and B is more likely to be maintained.

Although the example provided above utilizes a client/server architecture, it should be appreciated that these techniques may be equally applied in peer-to-peer contexts. Alternative embodiments may be discussed below with respect to the following figures.

FIG. 1 is a schematic diagram illustrating an example environment 100 suitable for implementing aspects of a synchronization engine 112, in accordance with at least one embodiment. The environment 100 may include content provider computer(s) 102, supplemental data provider computer(s) 104, any suitable number of user devices (e.g., user devices 106-110). An instance of synchronization engine 112 may operate on each respective user device. In some embodiments, the synchronization engine 112 may operate as part of an application running on each user device, or as a standalone engine. The content provider computer(s) 102, the supplemental data provider computer(s) 104, the user device 106-110, and each instance of the synchronization engine 112 may be communicatively connected via network 114 (e.g., the Internet). In some examples, the content provider computer(s) 102 and the supplemental data provider computer(s) 104 may be operated by, or on behalf of a same entity or different entities.

The content provider computer(s) 102 may be configured to transmit a data stream of the content 103 (e.g., a song, an album, a television episode/series, a movie, a live broadcast, a podcast, or any suitable electronic content). The content 103 may be provided in any suitable format. In some embodiments, the content 103 may be provided in multiple formats. The content provider computer(s) 102 may be configured to transmit the content 103 to the synchronization engine 112 of each user device 106-110 and/or an application (not depicted) associated with the synchronization engine 112 of each user device 106-110.

The supplemental data provider computer(s) 104 may be configured to provide supplemental data 105 (e.g., a telephone call, a video chat, text/SMS messages, etc.) associated with a group of user devices. The supplemental data provider computer(s) 104 may be configured to transmit and receive supplemental data 105 to/from each of the user devices 106-110 (e.g., via the same application associated with the synchronization engine 112).

Any suitable number of user devices (e.g., the user devices 106-110) may be utilized in the examples provided herein. Each user device may be any suitable electronic device (e.g., a laptop computer, a desktop computer, a tablet, a television, a smartphone, etc.) capable of transmitting and receiving data over the network 114 (e.g., the Internet). Each user device may be located in a different location. In the example depicted, user device 106 may be located at location 116 (e.g., Seattle, Wash., USA), user device 108 may be located at location 118 (e.g., Cupertino, Calif., USA), and user device 110 may be located at location 120 (e.g., Miami, Fla., USA). The particular number and respective locations of the user devices of FIG. 1 are intended to be illustrative only. More or fewer user devices may be included, each being located at any suitable location. Each user device may operate any suitable number of applications including an application configured to provide, at a display and/or speaker of the user device, content 103 and/or supplemental data 105. In some embodiments, these respective applications may receive content 103 and/or supplemental data 105 directly, or via an instance of the synchronization engine 112 operating as part of the application or as a standalone module of each user device.

The synchronization engine 112 operating at each user device (e.g., the user devices 106-110) may be configured to receive content 103 and/or to determine that content 103 has been received by a corresponding application operating at each user device. The content 103 (e.g., a 2-hour long movie) may be received via any suitable number of packets corresponding to a sub-portion of the content 103. By way of example, the content 103 may be transmitted by the content provider computer(s) 102 and received by the application and/or the synchronization engine 112 via 7,200 data packets. Each data packet payload may include at least a portion (e.g., a 2-second portion) of the content 103. Each data packet may further include a content index (e.g., an identifier) corresponding to a sequence and/or order by which the data packet is to be provided at the user device with respect to other received packets. As a non-limiting example, the content 103 may be streamed to the user devices 106-110 and the individual packets may be provided according to a chronological order (e.g., packet 1, followed by packet 2, followed by packet 3, and so forth).

In some embodiments, the synchronization engine 112 may be configured to synchronize playback of the content 103 across user devices 106-110. By way of example, any suitable interface provided via the user devices 106-110 (e.g., via an application operating on each respective device, via a web browser operating on each user device, etc.) may be utilized to perform a group viewing of the content 103. As a non-limiting example, an application of the user device 106 may be utilized to form a group. In some embodiments, an interface provided by the application may enable the other users to be identified (e.g., via any suitable means such as via phone number, email address, or the like). In some embodiments, each identified user (e.g., users of user device 108 and 110) may receive an invitation (e.g., an electronic message such as an email message, a text message, or the like) that includes a group identifier. The users may utilize respective applications of the user devices 108 and 110, to input the group identifier provided in the invitation in order to be navigated to a network page and/or user interface associated with the group. As another example, a hyperlink may be provided in the invitation that, upon selection, opens the application and navigates the user to a particular network page associated with the group. In still further examples, a group network page may be preconfigured and provided via the application and each user may coordinate with the other users to navigate to a particular network page via any suitable interface of the application.

Once the user devices 106-110 have accessed the particular network page associated with the group (hereafter referred to as a "group interface"), any user of the user devices 106-110 may utilize any suitable interface element of the group interface to select content 103. Content 103 may, in some embodiments, be selected from a library (e.g., an electronic catalog hosted by the content provider computer(s) 102). In some embodiments, the library may include any suitable number of content instances to which the selecting user has previously purchased viewing rights. The selecting user may be required to provide login credentials or other suitable authentication information to the content provider computer(s) 102 via the application before access to the library and/or access to the content 103 may be granted. A group communication (e.g., a multi-user telephone call, a multi-user video chat, a chat window, etc.) may be initiated via the group interface at any suitable time (e.g., prior to accessing the content 103). Supplemental data 105, corresponding to the group communication, may be transmitted by the supplemental data provider computer(s) 104 and provided at each user device via the respective applications. Supplemental data 105 corresponding to the group communication may be received by the supplemental data provider computer(s) 104 from any of the user devices of the group. In some embodiments, the functionality of supplemental data provider computer(s) 104 may be performed by the content provider computer(s) 102.

Once content 103 has been selected, any of the users of user devices 106-110 may select an option to begin playback of the content 103. Upon selection the option, a playback request including an identifier for the content (and in some cases the group identifier) may be transmitted to the content provider computer(s) 102. Upon receiving a playback request, the content provider computer(s) 102 may begin sequential transmission of any suitable number of content packets corresponding to various sub-portions of the content 103. The sequential transmission may be in accordance with a predetermined sequence/order and each message transmission may include a content index value (e.g., a packet/message identifier) corresponding to an order by which the packet content is to be played.

The synchronization engine 112 of each of user devices 106-110 may be configured to transmit to the content provider computer(s) 102 (e.g., periodically, upon receipt of one or more packet(s), etc.) an indication of a last portion of the content 103 received (e.g., a packet number corresponding to the last packet received). The content provider computer(s) 102 may be configured to utilize the indications received from each user device to identify a particular content index in the sequence, the particular content index corresponding to a particular content packet that occurs latest in the sequence and that has been received by each of the user devices 106-110.

The content provider computer(s) 102 may transmit the identified content packet index to each of the user devices 106-110. Upon receipt, the synchronization engine 112 operating at each respective device may be configured to ensure that only content packets with an index (e.g., a run time, a packet number, etc.) that is equal to or that occurs before the content index received are displayed at the user device, while content packets with a content index that occurs after the content index received are not displayed at the user device. This process may be performed any suitable number of times. As the user devices 106-110 continue to receive content packets, they may continuously update the content provider computer(s) 102 with the last packet received, which in turn may cause the content provider computer(s) 102 to update the user devices 106-110 with the last commonly received content index value. Utilizing these techniques, the synchronization engine 112 operating at each user device may ensure that the playback of the content 103 is synchronized at each devices such that the users are presented the same portions of the content 103 at substantially the same time. Said another way, if one or more user devices lags behind (e.g., based on the capabilities of the particular user devices, the download speeds of the particular user device's network connection, or the like), the synchronization engine 112 may ensure that playback at the other user devices is paused/delayed until playback of the content 103 may once again be synchronized. When playback is paused/delayed, the synchronization engine 112 may be configured to display any suitable notification indicating one or more reasons for the action (e.g., "synchronizing, please wait").

It should be appreciated that the group interface may provide a number of options to the users of the group. For example, any of the users of user devices 106-110 may be provided navigation controls (e.g., buttons, sliders, etc.) to navigate within the content 103. A navigation action (e.g., pause, stop, fast forward, skip, rewind, etc.) performed by one user device may be replicated on each user device in the group. Thus, if user device 110 is used to pause the content 103, the action may be transmitted to the other user devices (e.g., directly, or via the content provider computer(s) 102) such that the content 103 is paused at all of the user devices 106-110.

In some embodiments, the functionality for determining the latest commonly received content index may be performed via one or more of the user devices 106-110 rather than the content provider computer(s) 102. These embodiments may be discussed further below with respect to FIG. 4.

Figure 2:
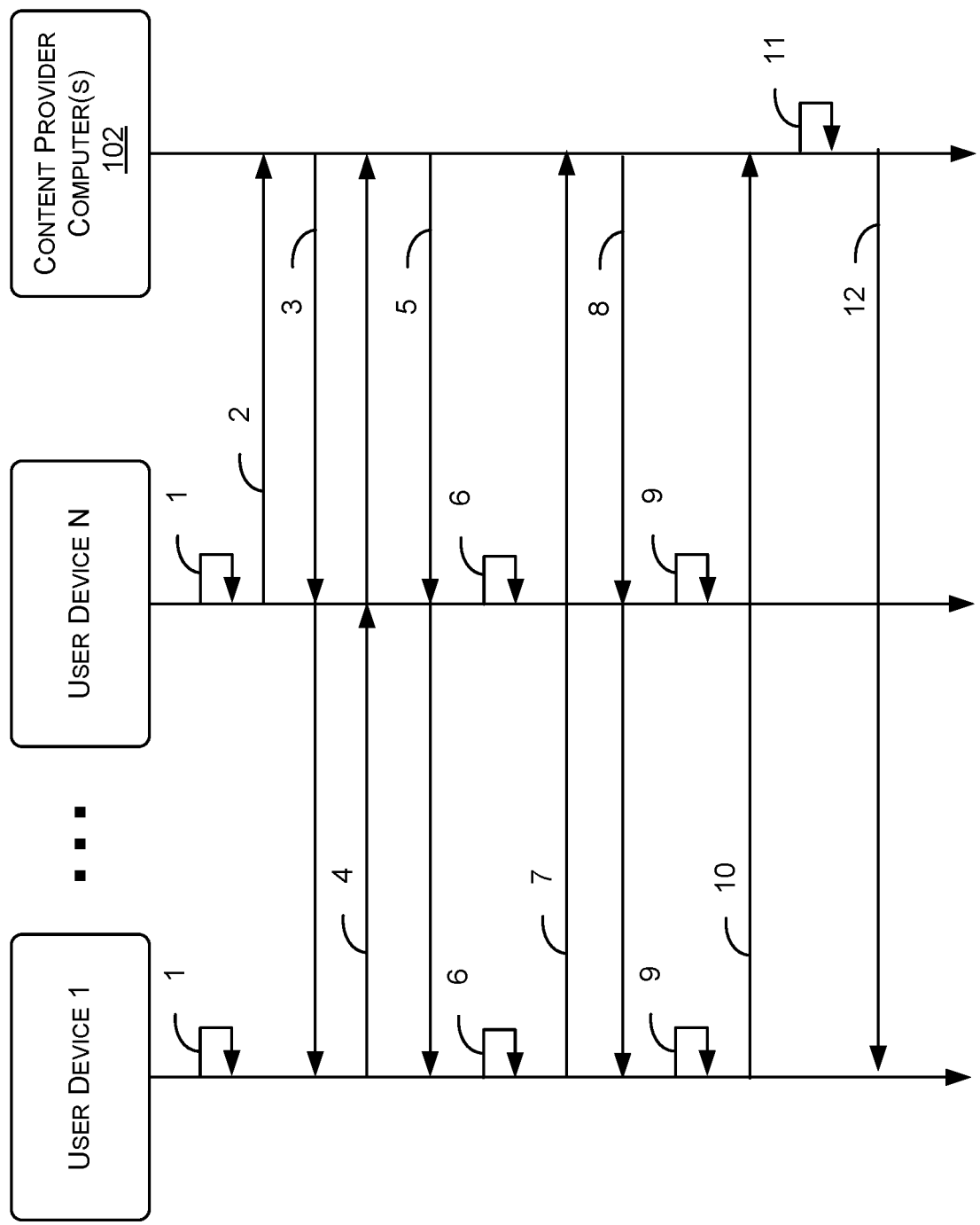
FIG. 2 is a flow diagram illustrating an example process for synchronizing content across multiple user devices utilizing a synchronization engine, in accordance with at least one embodiment.

FIG. 2 is a flow diagram illustrating an example process 200 for synchronizing content across multiple user devices utilizing a synchronization engine (e.g., the synchronization engine 112 of FIG. 1), in accordance with at least one embodiment. Although two user devices (e.g., user device 1 and user device N) are utilized in FIG. 2, any suitable number of user devices may be utilized. User devices 1-N are intended to be examples of the user devices 106-110 of FIG. 1. A corresponding instance of the synchronization engine 112 of FIG. 1 may operate on each of the user devices 1-N. Any of the functionality discussed in connection with FIG. 2 as being provided by the user devices 1-N may be provided by corresponding synchronization engines of each device.

Process 200 may begin at step 1, where user devices 1-N may utilize any suitable application (e.g., a streaming application, a web browser, etc.) operating on each respective user device to navigate to a group interface provided by the application. In some embodiments, the group interface may correspond to a network page viewable by each of the user devices 1-N via the application. Each of the user devices 1-N may be associated with a group identifier and the association may be communicated to the content provider computer(s) 102 at any suitable time (e.g., upon accessing the group interface, upon joining a group, upon requesting content by a member of the group, etc.). In some embodiments, the content provider computer(s) 102 may maintain a record identifying each of the user devices 1-N associated with a particular group identifier. In some embodiments, device capability information (e.g., hardware identifiers, software identifiers, video/audio drivers, processor identifiers, processor speeds, device identifiers/device model numbers, etc.) of the user device and/or network capability information (e.g., network connection download/upload speeds, etc.) corresponding to a network connection utilized by a user device may be communicated to the content provider computer(s) 102 at any suitable time. The content provider computer(s) 102 may maintain this information as an association to each respective user device (e.g., as part of the record associated with the group).

At step 2, a user device (e.g., user device N) may select or otherwise access a particular instance of content (e.g., content 103 of FIG. 1). By way of example, the user device N may be utilized to search a content library (e.g., an electronic catalog) from which the content may be selected. Once selected, a content identifier (e.g., a title, an alphanumeric identifier, etc.) may be transmitted to content provider computer(s) 102. In some embodiments, the user of user device N (or any of the users of the user devices 1-N) may be required to provide user login credentials and/or authentication information to the content provider computer(s) 102 prior to being allowed access to the content. The content provider computer(s) 102 may be configured to authenticate a user utilizing the login credentials and/or authentication information provided. In some embodiments, the content provider computer(s) 102 may be configured to ensure that at least one user of the group has previously purchased digital rights to the content. In some embodiments, the content provider computer(s) 102 may enable the content to be purchased/rented via the group interface by any suitable number of users via the respective user devices 1-N.

At step 3, the content provider computer(s) 102 may transmit one or more content packets to the user devices of the group. In some embodiments, a content packet may contain a sub-portion of the content (e.g., a 2 second portion, a 5 second portion, a 3 minute portion, etc.). Each content packet may include a content index (e.g., an identifier that uniquely identifies the portion of the content and that indicates a sequence by which the portions of content are to be provided). For example, a first packet of the content including the first 2 second portion of a motion picture may be associated with content index 1, a second packet of the content including a second 2 second portion of the motion picture may be associated with content index 2, a third packet of the content including a third 2 second portion of the motion picture may be associated with content index 3, and so on. It should be appreciated that the format of the content provided to each user device of the group may be the same or may vary (e.g., based at least in part on the device capabilities of each user device and/or the network capabilities of the network connection utilized by the respective user devices). In some embodiments, the content provider computer(s) 102 may provide the content in multiple formats such that content packets for each format (e.g., each format utilized by the group) may be provided to each user device of the group. Alternatively, the content provider computer(s) 102 may be configured to identify a particular format to be provided to each user device (e.g., based at least in part on the device capabilities of a respective user device and/or the network capabilities of the network connection utilized by the respective user device).

At step 4, the user devices 1-N may each transmit to the content provider computer(s) 102 an indication of the last content packet received by the user device. By way of example, user device 1 may transmit the content index corresponding to the last packet it received (e.g., content index "22"), while user device N may transmit the content index corresponding to the last packet it received (e.g., content index "28"). Based on receiving the corresponding indications, the content provider computer(s) 102 may identify a content index corresponding to a portion that occurs latest in the content with respect to all of the content packets that have been received by all of the user devices in the group. In some embodiments, the content provider computer(s) 102 may perform a comparison of the last received content indices provided by each user device to determine a lowest index value. The lowest index value may correspond to a portion of the content that occurs latest in the content with respect to all of the portions of content previously received by all of the user devices 1-N.

At step 5, the content provider computer(s) 102 may transmit the identified content index to each of the user devices 1-N (e.g., each of the user devices of the group).

At step 6, the user devices 1-N may utilize the content index received from the content provider computer(s) 102 to determine whether or not a particular portion of content is to be provided at the user device. By way of example, if the content index received was "22", user devices 1-N may be configured to play the content through the portion corresponding to content index "22". Once any of the user devices 1-N reach a point at which a portion of the content corresponding to content index "23" is to be played, the user device may be configured to pause and/or display a notification to the user that the content is delayed until a content index is received from the content provider computer(s) 102 indicating that content index "23" (or an even later content index) has been received by all of the user devices 1-N. The steps 3-6 may be performed any suitable number of times.

It should be appreciated that, at any suitable time, the content provider computer(s) 102 may be configured to identify when a particular user device has lagged behind other user devices of the group with respect to playback of the content. Based at least in part on the content indices received periodically from each user device, the content provider computer(s) 102 may identify that a particular user device has caused playback delay to occur at one or more user devices of the group over a threshold number of times and/or that the playback delay has exceeded a threshold amount of time (e.g., 30 seconds, 1 minutes, etc.). In some embodiments, the content provider computer(s) 102 may be configured to identify that the format of the content provided to the user device is to be modified. For example, the content provider computer(s) 102 may utilize a predetermined protocol set to identify a different format for content to be provided to the user device (e.g., SD instead of HD, HD instead of 4K, etc.). In other words, the content provider computer(s) 102 may determine that the quality (e.g., resolution quality) of the content played at the user device 1 should be degraded such that the user device may be more likely to process the content in the degraded format more quickly than it was previously processing the content at a higher resolution format. Accordingly, the content provider computer(s) may alter the format of the content provided to the particular user device and update a record indicating the current format being provided to that user device.

Alternatively, the content provider computer(s) 102 may provide the content in multiple formats such that content packets for each format (e.g., each format utilized by the group) may be provided to each user device of the group. In the situation in which the content provider computer(s) 102 determine that a particular user device is causing playback delay as described above, the content provider computer(s) 102 may transmit any suitable data to the lagging user device to cause the user device to utilize content packets of a lesser resolution format.

At step 7, a user device (e.g., the user device 1) may utilized to provide user input at the group interface. In some embodiments, the user input may correspond to a navigation action (e.g., play, pause, stop, skip, rewind, etc.). In some embodiments, playback of the content at the user device may be modified (e.g., paused) immediately. The user input may be transmitted to the content provider computer(s) 102 as depicted. In some embodiments, the user input may be transmitted directly to each of the other user devices in the group.

At step 8, the user devices may receive, from the content provider computer(s) 102 (or other user devices of the group) indication of the user input provided at the user device 1. The indication may be received by each application and/or synchronization engine operating at each user device. The user devices may be configured to modify playback of the content according to the user input.

At step 9, upon receipt of the indication of the user input (e.g., indicating a pause action at user device 1) each user device (e.g., the user device N) may modify playback of the content according to the user input. Thus, a pause action performed at user device 1 may cause the content to be paused not only at user device 1, but also at all of the other user devices of the group (e.g., user device N). Steps 7-9 may be performed any suitable number of times at any suitable time.

At step 10, user device 1 may be used to disassociate user device N from the group. By way of example, a user interface provided by the application operating on user device 1 may be utilized to indicate that user device N and/or the user corresponding to user device N is to be removed from the group. This option may be provided via any/all of the user devices 1-N. Upon selection, the selection device (e.g., user device 1) may transmit an identifier corresponding to the user device N to the content provider computer(s) 102. It should be appreciated that, in some embodiments, any one of the user devices of the group may be utilized to disassociate itself from the group (e.g., utilizing any suitable group interface, via exiting the application, by turning of the user device, etc.).

In some embodiments, any of the user devices of the group may temporarily suspend synchronization efforts. By way of example, a user device of the group may utilize any suitable aspect of the group interface to suspend playback of the user device temporarily. While suspending playback, the user device may discontinue transmitting a last packet received. In some embodiments, receiving an indication that the user device has suspended playback may further cause the content provider computer(s) 102 to cease streaming (at least during the time of suspension) the content to the suspended user device. While playback at a user device is suspended, the remaining user devices of the group may continue playback without taking into account the playback suspension at the user device. At a subsequent time, the user device may utilize any suitable element of the group interface to indicate a desire to resume playback. In some scenarios, upon selection an option indicating a desire to resume playback, the user device may once again begin transmitting its last packet received and synchronization efforts may resume taking into account playback occurring at the user device. This may cause the user device to begin receiving content corresponding to a current playback index. As a non-limiting example, a user may suspend playback utilizing his user device while he enters an elevator (or for any suitable reason). Upon exiting the elevator, the user may utilize the user device to indicate that he'd like to resume playback. While suspended, playback at the other user devices may continue without regard to playback being suspended at the user's device. Once playback is resumed at the user device, synchronization efforts may once again factor in the packets being received by the user device.

At step 11, the content provider computer(s) 102 may update a group record to delete an identifier associated with the user device. In some embodiments, receiving this indication may cause the content provider computer(s) 102 to cease transmission of the content to the user device N.

At step 12, the content provider computer(s) 102 may proceed with transmitting content to the remaining user devices of the group (e.g., user device 1). Although steps 10-12 depict removal of one user device from the group utilizing a different user device, it should be appreciated that any user may remove themselves from the group utilizing similar techniques and/or by exiting the group interface, shutting off his user device, exiting the application, or the like.

Figure 3:
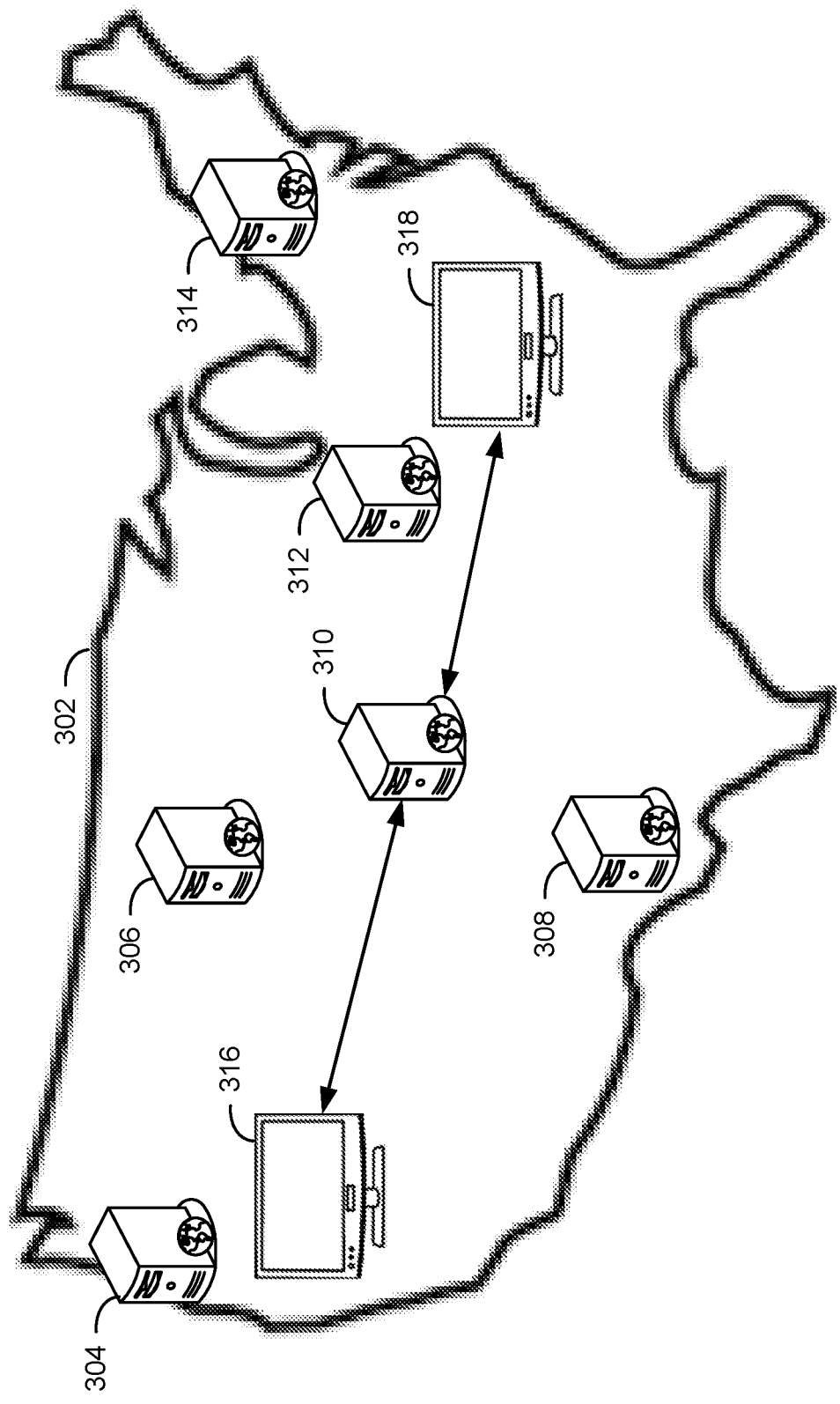
FIG. 3 is a schematic diagram illustrating another a process for identifying a content provider, in accordance with at least one embodiment.

FIG. 3 is a schematic diagram 300 illustrating another a process for identifying a content provider, in accordance with at least one embodiment. In some embodiments, a geographical area (e.g., geographical area) may include any suitable number of content provider computers (e.g., content provider computers 304-314). Each of the content provider computers 304-314 are intended to be examples of the content provider computer(s) 102 of FIG. 1. Each of the content provider computers 304-314 may be configured to stream content to any suitable number of user devices (e.g., user devices 316 and 318, each an example of the user devices 106-110 of FIG. 1).

Conventionally, a user requesting content via user device 316 might be eventually served such content from a closest available server. By way of example, the content provider computer 304 may provide content to user device 316 based at least in part on the geographical distance between the content provider computer 304 and the user device 316 being shorter than any other distance to any other available content provider computers (e.g., the content provider computers 306-314). Similarly, content provider computer 312 may be selected to provide content to user device 318 based on conventional techniques. However, in situations in which content is to be communally viewed (e.g., by user devices 316 and 318 according to the techniques discussed herein), this may cause content packet processing to be slower at one device (e.g., user device 318) than at the other (e.g., the user device 316) because corresponding latencies of the content provider computer 304 and the content provider 312 may differ (e.g., based on the processing capabilities of each device, based at least in part on the respective network distances between the content provider computer 304/312 and the user device to which content is being transmitted, and so forth).

In order to minimize the latency of providing content to each user device of the group (e.g., the user devices 316 and 318), a content provider computer may be selected that is determined to be substantially equidistant between the user devices 316 and 318. In some embodiments, the content provider computer 310 may be selected from the content provider computers 304-314 based on determining that the average value of the distances between each user device of the group and the selected content provider computer was less than the average value for the distances between each user device of the group and the other content provider computers.

In some embodiments the user devices 316 may be determined to be associated with a group identifier. A location for each user device of the group may be determined. These locations may be provided by user input, previously associated with the user device 316 (e.g., at setup of the user device 316), and/or the locations for each user device may be ascertained utilizing any suitable location-determining hardware and/or software module (e.g., a global positioning system (GPS) component) of the user device. A record indicating the corresponding locations of each of the content provider computers 304-314 may be accessed. The distances between the location corresponding to user device 316 and each of the content provider computers 304-314 may be calculated using any suitable algorithm. Similarly the distances between the location corresponding to user device 318 and each of the content provider computers 304-314 may be calculated and/or obtained.

For any given content provider computer, an average value may be calculated using the distances between that content provider computer and the respective user devices 316 and 318. By way of example, the distance between content provider computer 304 and the user device 316 may be 380 miles, while the distance between content provider computer 304 and the user device 318 may be 3000 miles, which may provide an average distance of 1,690 miles (e.g., 3000+380/2). Similarly, the distance between content provider computer 310 and the user device 316 may be 1580 miles, while the distance between content provider computer 304 and the user device 318 may be 1500, which may provide an average distance of 1,540 miles (e.g., 1,500+1,580/2). These types of calculations may be repeated for each content provider computer of the content provider computers 304-314.

Content provider computer 310 may be selected as the content provider for a group containing user device 316 and user device 318 based at least in part on a determination that the average distance calculated above with respect to content provider computer 310 was the lowest of the average distances calculated above with respect to the content provider computers 304-314. Accordingly, content provider computer 310 may be selected to provide content to the group such that difference between distance-based latencies associated with transmitting and receiving data between the content provider computer 310 and the user device 316 and between the content provider computer 310 and the user device 318 is minimized. Selecting a content provider computer to minimize a difference between distance-based latencies potentially experienced by the user devices, may result in a smoother viewing experience as the content is synchronized across devices in the manner discussed herein.

Figure 4:
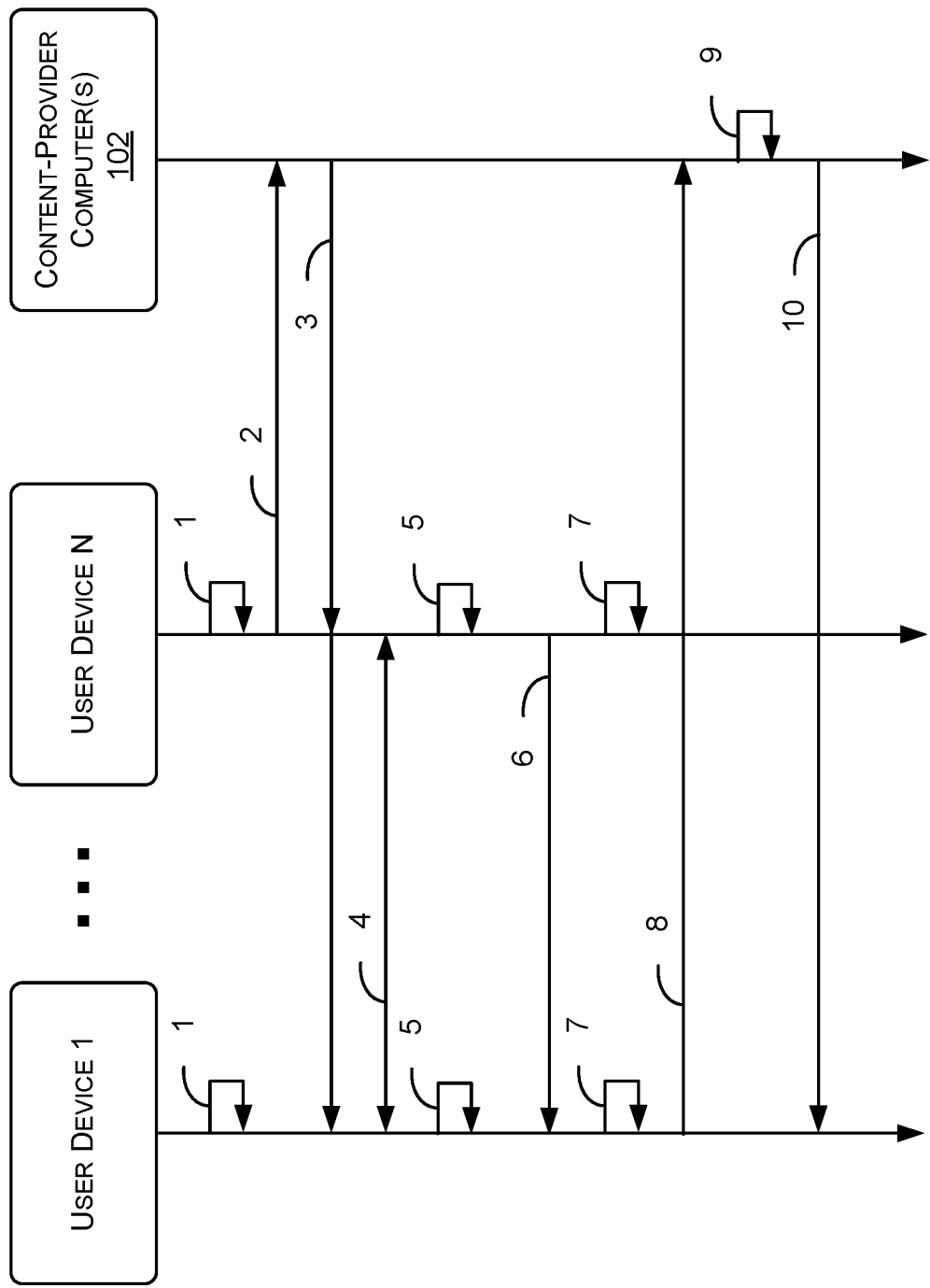
FIG. 4 is a flow diagram illustrating another example process for synchronizing content across multiple user devices utilizing a synchronization engine, in accordance with at least one embodiment.

FIG. 4 is a flow diagram illustrating another example process 400 for synchronizing content across multiple user devices utilizing a synchronization engine (e.g., the synchronization engine 112 of FIG. 1), in accordance with at least one embodiment. Although two user devices (e.g., user device 1 and user device N) are utilized in FIG. 4, any suitable number of user devices may be utilized. User devices 1-N are each intended to be an example of any of the user devices 106-110 of FIG. 1. A corresponding instance of the synchronization engine 112 of FIG. 1 may operate on each of the user devices 1-N. Any of the functionality discussed in connection with FIG. 4 as being provided by the user devices 1-N may be provided by corresponding synchronization engines operating on each device of each device.

Process 400 may begin at step 1, where user devices 1-N may be utilized to create a group and/or associate a user with a group. By way of example, user device 1 may be utilized to create a group (or identify a previously created group) utilizing any suitable interfaces provided by an application operating on the user device 1 (e.g., the application 606 of FIG. 6, a streaming application, a web browser, etc.). The remaining user devices may be utilized to navigate to a group interface (e.g., a network page associated with the group). In some embodiments, the group interface may correspond to a network page viewable by each of the user devices 1-N. Each of the user devices 1-N may be associated with a group identifier and the association may be communicated to the content provider computer(s) 102 at any suitable time (e.g., upon creating the group, upon accessing the group interface, upon user input, etc.). In some embodiments, the content provider computer(s) 102 may maintain group membership information identifying each of the user devices 1-N as being associated with a particular group identifier. In some embodiments, device capability information and/or network capability information corresponding to a network connection utilized a user device may be communicated to the content provider computer(s) 102 at any suitable time. The content provider computer(s) 102 may maintain this information as an association to each respective user device (e.g., as part of the group membership information).

At step 2, user device N (or any user device of the user devices 1-N) may be utilized to select or otherwise access (e.g., via the group interface) a particular instance of content (e.g., content 103 of FIG. 1). In some examples, the user device N may be utilized to search a content library (e.g., an electronic catalog) from which content may be selected. Once selected, a content identifier (e.g., a title, an alphanumeric identifier, etc.) may be transmitted to content provider computer(s) 102. In some embodiments, the user of user device N (or any of the users of the user devices 1-N) may be required (e.g., prompted) to provide user login credentials and/or authentication information to the content provider computer(s) 102 prior to being allowed access to the content. The content provider computer(s) 102 may be configured to authenticate a user utilizing the login credentials and/or authentication information provided. In some embodiments, the content provider computer(s) 102 may be configured to ensure that at least one user of the group has previously purchased digital rights to the content. In some embodiments, the content provider computer(s) 102 may enable the content to be purchased/rented via the group interface by any suitable number of users via the respective user devices 1-N.

At step 3, the content provider computer(s) 102 may transmit one or more content packets to the user devices of the group. In some embodiments, a content packet may contain a sub-portion of the content (e.g., a 2 second portion, a 5 second portion, a 3 minute portion, etc.). Each content packet may include a content index (e.g., an identifier that uniquely identifies the portion of the content and indicates a sequence by which the portions of content are to be provided). For example, a first packet of the content including the first 2 second portion of a motion picture may be associated with content index 1, a second packet of the content including a second 2 second portion of the motion picture may be associated with content index 2, a third packet of the content including a third 2 second portion of the motion picture may be associated with content index 3, and so on.

It should be appreciated that the format of the content provided to each user device of the group may be the same or may vary (e.g., based at least in part on the device capabilities of each user device and/or the network capabilities of the network connection utilized by the respective user devices). In some embodiments, the content provider computer(s) 102 may provide the content in multiple formats such that content packets for each format (e.g., each format available) may be provided to each user device of the group. Alternatively, the content provider computer(s) 102 may be configured to identify a particular format to be provided to each user device of the group (e.g., based at least in part on the device capabilities of the respective user devices and/or the network capabilities of the network connection utilized by the respective user devices). In some embodiments, the particular format may be identified based at least in part on determining a highest resolution capable of being presented on all of the user devices of the group and/or that is likely to be processed under a threshold amount of time in light of the network connections of each of the user devices of the group.

At step 4, the user devices 1-N may each transmit to each of the other user devices an indication of the last content packet received. By way of example, user device 1 may transmit the content index corresponding to the last packet it received (e.g., content index "22") to user device 1 (and any other user devices of the group). Similarly, user device N may transmit the content index corresponding to the last packet it received (e.g., content index "28") to the user device N (and any other user devices of the group). Based on receiving the corresponding indications, each of the user device 1-N may identify a content index corresponding to a portion that occurs latest in the content with respect to all of the content packets that have been received by all of the user devices in the group. In some embodiments, each user device may perform a comparison of its last received content index to the last received content indices provided by the other user devices to determine a lowest index value. The lowest index value may correspond to a portion of the content that occurs latest in the content with respect to all of the portions of content previously received by all of the user devices 1-N.

It should be appreciated that, at any suitable time, a user device may be configured to identify when it has lagged behind other user devices of the group with respect to playback of the content. For example, the user device may determine that it has caused playback delay to occur for at least one other user device of the group over a threshold number of times and/or that the playback delay has exceeded a threshold amount of time. In some embodiments, the user device may be configured to identify that the format of the content utilized for playback is to be modified. For example, the user device may utilize a predetermined protocol set to identify a different format for playback (e.g., SD instead of HD, HD instead of 4K, etc.). In other words, user device may determine that the quality (e.g., resolution quality) of the content should be degraded such that the user device may be more likely to process the content in the degraded format more quickly than it was previously processing the content at a higher resolution format. Accordingly, the user device may perform any suitable operations to alter the format of the content provided to the particular user device. By way of example, if the user device is already in receipt of content packets in a lower resolution format, the user device may perform operations to begin processing those content packets for playback. If the user device is currently receiving content packets in a higher resolution format (e.g., HD), the user device may perform any suitable operations (e.g., transmit a format request change to the content provider computer(s) 102) to request content packets of a different format (e.g., SD). Upon receipt of such a request, the content provider computer(s) 102 may be configured to change the format of the content packets provided to the user device to the format requested (or at least a lower resolution format than previously provided).

At step 5, each of the user devices 1-N may determine whether or not to modify playback of the content based at least in part on the content index identified. By way of example, the latest content index received by all of the user devices 1-N might be identified as "32". Accordingly, each of the user devices 1-N play the content it has received through the content packet identified with index "32," but no further. This may ensure that no user device plays content that has not been received by all of the user devices in the group. The steps 3-6 may be performed any suitable number of times.

At step 6, a user device (e.g., the user device N) may utilized to provide user input at the group interface. In some embodiments, the user input may correspond to a navigation action (e.g., play, pause, stop, skip, rewind, etc.). The user input may be transmitted by the user device N to each of the other user devices in the group (e.g., user device 1).

At step 7, the navigation action may be performed on each of the user devices 1-N. For example, upon receipt of the user input (e.g., indicating a pause action at user device 1) each user device (e.g., the user device N) may modify playback of the content according to the user input. Thus, a pause action performed at user device 1 may cause the content to be paused not only at user device 1, but also at all of the other user devices of the group (e.g., user device N). Steps 6-7 may be performed any suitable number of times at any suitable time.

At step 8, user device 1 may be used to disassociate user device N from the group. By way of example, a user interface provided by the application operating on user device 1 may be utilized to indicate that user device N and/or the user corresponding to user device N is to be removed from the group. This option may be provided to any/all of the user devices 1-N. Upon selection, the selection device (e.g., user device 1) may transmit an identifier corresponding to the user device N to the content provider computer(s) 102. It should be appreciated that, in some embodiments, any one of the user devices of the group may be utilized to disassociate itself from the group (e.g., utilizing any suitable group interface, via exiting the application, by turning of the user device, etc.).

It should be appreciated, that at any suitable time, any of the user devices of the group may temporarily suspend synchronization efforts at the user device. By way of example, a user device of the group may utilize any suitable aspect of the group interface to suspend playback of the user device temporarily. While suspending playback, the user device may discontinue transmitting a last packet received (e.g., to the other user devices of the group). In some embodiments, receiving an indication that the user device has suspended playback may further cause the content provider computer(s) 102 to cease streaming (at least during the time of suspension) the content to the suspended user device. Still further, the other user devices of the group may receive an indication that a particular user device has suspended playback. In these scenarios, the other user devices may continue synchronization efforts amongst themselves irrespective of the fact that the user device has suspended playback (e.g., utilizing packet numbers provided by the non-suspended user devices of group). At a subsequent time, the user device may utilize any suitable element of the group interface to indicate a desire to resume playback. In some scenarios, upon selection an option indicating a desire to resume playback, the content provider computer(s) 102 may resume streaming to the user device to from a current playback index (e.g., from a content packet that was last received by all of the other user devices of the group). In some embodiments, the content provider computer(s) 102 may have continued streaming and the suspended user device may simply have suspended processing the received packets. In these embodiments, the user device may resume processing of the content packets based on the current playback index (e.g., from a content packet that was last received by all of the other user devices of the group). After resuming playback, the user device may once again begin transmitting its last packet received and synchronization efforts may resume taking into account playback occurring at the user device.

Returning to the example of FIG. 4, at step 9, after receiving an indication that a user device is to be disassociated from the group, the content provider computer(s) 102 may update a group record to delete an identifier associated with the user device N. In some embodiments, receiving this indication may cause the content provider computer(s) 102 to cease transmission of the content to the user device N.

At step 10, the content provider computer(s) 102 may proceed with transmitting content to the remaining user devices of the group (e.g., user device 1). Although steps 8-10 depict removal of one user device from the group utilizing a different user device, it should be appreciated that any user may remove themselves from the group utilizing similar techniques and/or by exiting the group interface, shutting off his user device, exiting the application, or the like.

Figure 5:
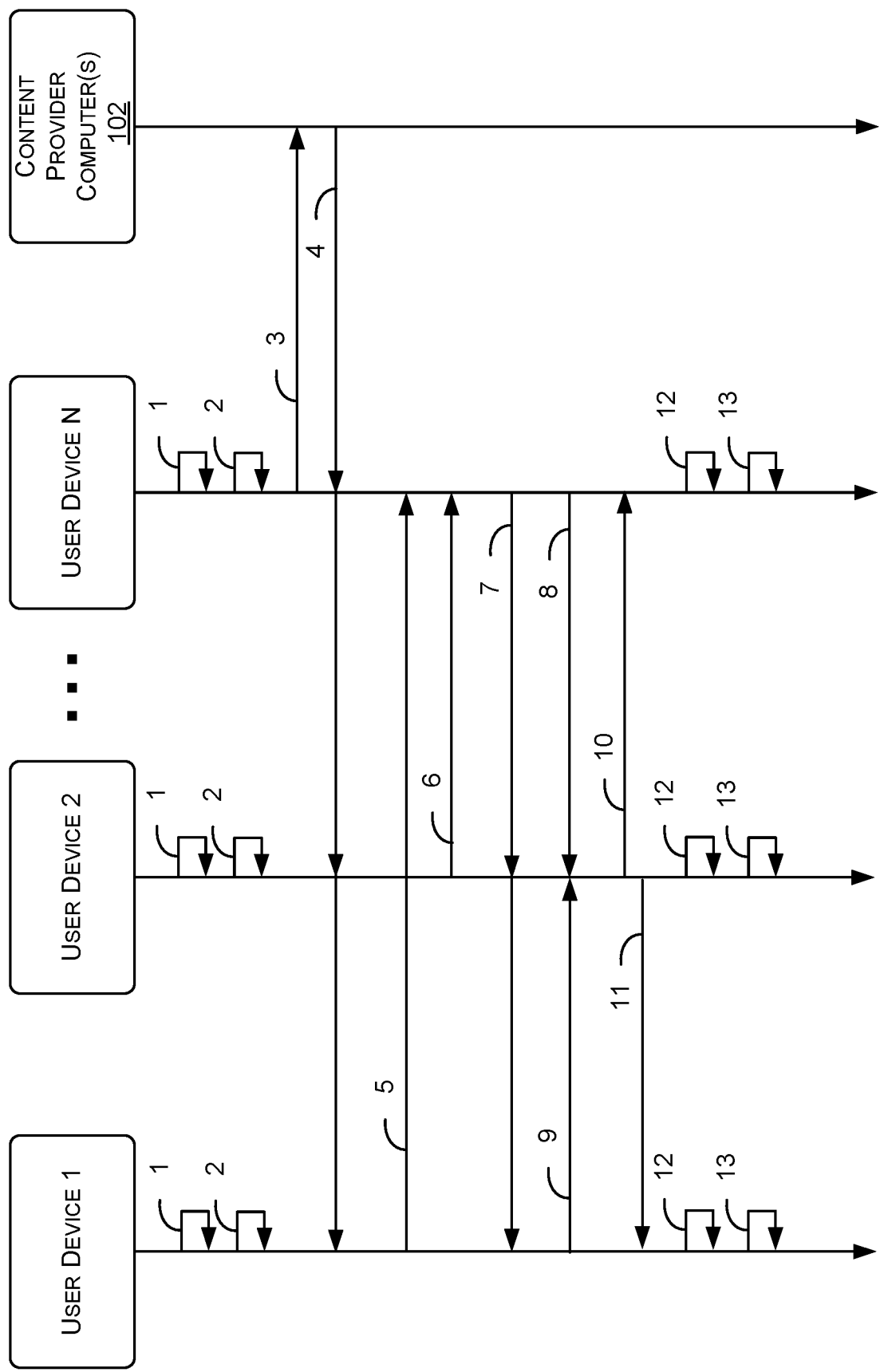
FIG. 5 is a flow diagram illustrating yet another example method for synchronizing content across multiple user devices utilizing a synchronization engine, in accordance with at least one embodiment.

FIG. 5 is a flow diagram illustrating yet another example process 500 for synchronizing content across multiple user devices utilizing a synchronization engine, in accordance with at least one embodiment. In the process 500, the content may be synchronized across user devices by the user devices themselves in a distributed manner. Although three user devices (e.g., user device 1, user device 2, and user device N) are utilized in FIG. 5, any suitable number of user devices may be utilized. User devices 1-N are each intended to be an example of any of the user devices 106-110 of FIG. 1. A corresponding instance of the synchronization engine 112 of FIG. 1 may operate on each of the user devices 1-N. Any of the functionality discussed in connection with FIG. 4 as being provided by the user devices 1-N may be provided by corresponding synchronization engines operating on each device of each device.

Process 500 may begin at step 1, where user devices 1-N may be utilized to create a group and/or associate a user device with a group. By way of example, user device 1 may be utilized to create a group (or identify a previously created group) utilizing any suitable interfaces provided by an application operating on the user device 1 (e.g., the application 606 of FIG. 6, a streaming application, a web browser, etc.). The remaining user devices (e.g., user devices 2-N) may be utilized to navigate to a group interface associated with the group. In some embodiments, the group interface may correspond to a network page viewable by each of the user devices 1-N. Each of the user devices 1-N may be associated with a group identifier and the association may be communicated to the content provider computer(s) 102 at any suitable time (e.g., upon creating the group, upon accessing the group interface, upon user input, etc.). In some embodiments, the content provider computer(s) 102 may maintain a record identifying each of the user devices 1-N as being associated with a particular group identifier.

At step 2, each of the user devices 1-N may be utilized to perform a process for electing a leader device of the group. The process for electing a leader device from the user devices 1-N may utilize any suitable election algorithm such as a bully algorithm, an improved bully election algorithm, a modified bully election algorithm, a ring election algorithm, a modified ring election algorithm, or the like. As part of performing the process for electing a leader device, the user devices 1-N may exchange any suitable data amongst themselves. Upon conclusion of the process for electing the leader device, an identifier for the leader device (e.g., user device N) may be known by each of the user devices 1-N. Each of the synchronization engines of the user devices 1-N may be configured with code that enables any of the user devices 1-N to operate as a leader device. Group membership information may be transmitted to the leader device or requested by the leader device from the content provider computer(s) 102 at any suitable time. In some embodiments, device capability information and/or network capability information corresponding to a network connection utilized by each user device may be communicated (e.g., by the content provider computer(s) 102, by the user devices of the group, etc.) to the leader device at any suitable time (e.g., upon election of the leader device, etc.). The leader device may maintain this information as an association to each respective user device (e.g., as part of the group membership information of the group).

At step 3, user device 2 (or any user device of the user devices 1-N) may be utilized to select or otherwise access (e.g., via the group interface) a particular instance of content (e.g., content 103 of FIG. 1). In some examples, the user device 2 may be utilized to search a content library (e.g., an electronic catalog hosted by the content provider computer(s) 102) from which content may be selected. Once selected, a content identifier (e.g., a title, an alphanumeric identifier, etc.) may be transmitted to content provider computer(s) 102. In some embodiments, the user of user device N (or any/all of the users of the user devices 1-N) may be required (e.g., prompted) to provide user login credentials and/or authentication information to the content provider computer(s) 102 prior to being allowed access to the content. The content provider computer(s) 102 may be configured to authenticate a user utilizing the login credentials and/or authentication information provided. In some embodiments, the content provider computer(s) 102 may be configured to ensure that at least one user of the group (or all users of the group) has previously purchased digital rights to the content. In some embodiments, the content provider computer(s) 102 may enable the content to be purchased/rented via the group interface by any suitable number of users via the respective user devices 1-N.

At step 4, the content provider computer(s) 102 may distribute one or more sets of content packets to the user devices of the group. In some embodiments, each content packet may contain a sub-portion of the content (e.g., a 2 second portion, a 5 second portion, a 3 minute portion, etc.). Each content packet may include a content index (e.g., an identifier that uniquely identifies the portion of the content and indicates a sequence by which the portions of content are to be provided). For example, a first packet of the content including the first 2 second portion of a motion picture may be associated with content index 1, a second packet of the content including a second 2 second portion of the motion picture may be associated with content index 2, a third packet of the content including a third 2 second portion of the motion picture may be associated with content index 3, and so on. As a non-limiting example, a first set of content packets (e.g., approximately a first-third of a motion picture) may be distributed to the user device 2, a second set of content packets (e.g., approximate a second-third of the motion picture) may be distributed to the user device 1, and a third set of content packets (e.g., approximately a third-third of the motion picture) may be distributed to the user device N.

The size of the portions of the content distributed to each user device of the group may differ or the size of the portion may be substantially equal. In some embodiments, the total of all of the sets of the content packets distribute to the user devices of the group may together form the whole of the content. In some embodiments, the content provider computer(s) 102 may additionally provide (e.g., to the elected leader, in this case, user device N) group membership information identifying the user devices of the group. The content provider computer(s) 102 and/or the user devices of the group may also provide device capabilities and/or network capabilities of the respective user devices to the elected leader.

In some embodiments, the content provider computer(s) 102 may provide an indication of which portions were provided to which user devices of the group. The recipient of this data (e.g., the leader device, user device N, each of the user devices of the group, etc.) may store these indications in a mapping or other data structure in order to subsequently identify a storage location corresponding to a particular content packet and/or portion. It should be appreciated that content portions distributed to the user devices of the group be in a single format (e.g., SD), or multiple format versions (e.g., SD, HD, 4K, etc.) of the content portions may be distributed. In some embodiments, the leader device N and/or each of the user devices of the group may store data indicating which format was provided to each of the user devices of the group. As a non-limiting example, the content provider computer(s) 102 may distribute content portions corresponding to the content in multiple formats such that user devices of the group may retrieve content portions corresponding to any of the multiple formats from the other user devices of the group.

At steps 5 and 6, the user devices 1 and 2 (and all of the user non-leader user devices of the group) may transmit content identification requests to the elected leader device. Given that the content has not begun to be played by any of the user devices 1-N, the elected leader device (user device N) may identify a storage location (e.g., utilizing the mapping discussed above) for a first portion of the content to be provided to all of the user devices. By way of example, the mapping may indicate that the first portion of the content (in a particular format, in multiple formats, etc.) has been distributed and stored by user device 1.

At step 7, user device N (the elected leader device) may transmit an indication that the first portion of the content is stored at the user device 2 (e.g., the storage location associated with the first portion of the content).

Based at least in part on receiving the indication that the first portion of the content is stored at the user device 2, or the leader's case based at least in part on identifying that the first portion of the content is stored at the user device 2, the user devices of the group (other than the user device 2) may request the portion of the content from user device 2. For example, the user device N may request the first portion of the content at step 8, and the user device 1 may request the first portion of the content at step 9. In some embodiments, the first portion of the content may be stored in a variety of formats at the user device 2. In these examples, the user devices of the group may request that portion of content in a specific format (e.g., SD, or HD, or 4K, etc.).

In response to these requests, the user device 2 may sequentially transmit (e.g., stream) any suitable number of content packets of the first portion of the content (e.g., in a particular format, according to the format requested, etc.) to the user device N at step 10 and to the user device 1 at step 11. In some embodiments, these transmissions may occur as a single transmission directed to the request device and/or via a broadcasted message transmission.

It should be appreciated that a mapping may not necessarily be maintained by the leader device, and a request need not necessarily be initiated by the user devices of the group in order to obtain content packets from other user devices of the group. In some embodiments, the storing user device may be configured to identify that content playing (or to be played) at the user devices 1-N requires the content currently stored by the user device. Upon determining this, the storing user device may be configured to automatically transmit (e.g., stream) content packets of the portion of content stored at the user device to the other user devices of the group. In some embodiments, these transmissions may be addressed and/or broadcasted to the user devices of the group. Further, it may be the case that the storing user device stores multiple formats of the content portion. In this scenario, the user storing user device may transmit the content portion in each of the multiple formats (e.g., as separate content packet messages). Still further, the mapping may be distributed to each user device in the group, and thus, each user device of the group may be configured to individually determine a storage location of the content and/or the particular format to be requested.

At step 12, the user devices 1-N may perform the steps 4-6 discussed above with respect to FIG. 4 to identify a content index of the sequence. It should be appreciated that execution of the steps 4-6 of FIG. 4 may cause each of the user devices 1-N to transmit to each of the other user devices an indication of the last content packet it received and individually determine the content index corresponding to the latest packet received by all of the user devices in the group.

In alternative embodiments of step 12, each of the user devices of the group (except for the leader) may transmit an indication that identifies the last packet received by each user device. Based on receiving the corresponding indications, the leader device (e.g., user device N) may identify a content index corresponding to a portion that occurs latest in the content with respect to all of the content packets that has also been received by all of the user devices in the group. In some embodiments, the leader device may perform a comparison of the last received content indices provided by each user device of the group to determine a lowest index value. The lowest index value may correspond to a portion of the content that occurs latest in the content with respect to all of the portions of content previously received by all of the user devices 1-N. The leader device may transmit the identify index value to the other user devices of the group.

Although not depicted, it should be appreciated that the leader device may be configured to identify when a particular user device has lagged behind other user devices of the group with respect to playback of the content. In other embodiments, each user device of any of the examples provided herein may be configured to identify when local playback has lagged behind playback occurring at the other user devices of the group (e.g., based at least in part on a comparison between the last content packet received at the user device and the last content packets received at other user devices and/or the particular content packet identified as having been commonly received at all of the user device(s) of the group). By way of example, based at least in part on the content indices received periodically from each user device, the leader device may identify that a particular user device (e.g., user device 1) has caused playback delay at least one other user device of the group over a threshold number of times and/or that the playback delay has exceeds a threshold amount of time and/or exceeds a threshold number of instances within a threshold period of time. In some embodiments, the leader device may be configured to identify that the format of the content provided to the user device is to be modified. For example, the leader device may utilize a predetermined protocol set to identify a different format for content to be provided to the user device (e.g., SD instead of HD, HD instead of 4K, etc.). In other words, the leader device may determine that the quality (e.g., resolution quality) of the content played at the user device 1 should be degraded such that the user device may be more likely to process the content in the degraded format more quickly than it was previously processing the content at a higher resolution format. In the situation in which the leader device determines that a particular user device is causing playback delay as described above, the leader device may transmit any suitable data to the lagging user device to cause the user device to utilize content packets of a lower resolution format. The determination of whether or not content is to be processed by a specific user device in a different format (e.g., a lower resolution format than originally processed) may also, or alternatively, be determined by the specific user device locally.

At step 13, each of the user devices 1-N may determine whether or not to modify playback of the content based at least in part on the content index identified at step 15. By way of example, the latest content index received by all of the user devices might be identified as "32." Accordingly, each of the user devices 1-N may play the content packets it has received through the content packet identified with index "32," but no further. This may ensure that no user device plays content that has not been received by all of the user devices in the group.

Although not depicted, at any suitable time, any of the user devices of the group may temporarily suspend synchronization efforts at the user device. By way of example, a user device of the group may utilize any suitable aspect of the group interface to suspend playback of the user device temporarily. While suspending playback, the user device may discontinue transmitting a last packet received (e.g., to the other user devices of the group, to the leader device, etc.). In some embodiments, receiving an indication that the user device has suspended playback may further cause the streaming device to cease streaming (at least during the time of suspension) the content to the suspended user device. Still further, the other user devices of the group may receive an indication that a particular user device has suspended playback. In these scenarios, the other user devices and/or the leader device may continue synchronization efforts amongst themselves irrespective of the fact that the user device has suspended playback (e.g., utilizing packet numbers provided by the non-suspended user devices of group).

At a subsequent time, the user device may utilize any suitable element of the group interface to indicate a desire to resume playback. In some scenarios, upon selection an option indicating a desire to resume playback, the streaming device may be configured to resume streaming to the user device to from a current playback index (e.g., from a content packet that was last received by all of the other user devices of the group). In some embodiments, the streaming device may have continued streaming and the suspended user device may simply have suspended processing of the received packets. In these embodiments, the user device may resume processing of the content packets based on the current playback index (e.g., from a content packet that was last received by all of the other user devices of the group). After resuming playback, the user device may once again begin transmitting its last packet received and synchronization efforts may resume taking into account playback occurring at the user device.

It should be appreciated that, at any suitable time, any of the user devices of the group may utilize any suitable interface element to disassociate one or more of the user devices from the group in the manner described above. Utilizing any suitable interface element, a user device may transmit (e.g., to the content provider computer(s) 102 and/or the leader device and/or the other user devices of the group) an indication that the user device is to be disassociated from the group. The receiving device may execute any suitable operations to remove that user device from the group. In some embodiments, the streaming device may (e.g., based at least in part on receiving an indication from the user device and/or the leader device) alter streaming such that content is no longer provided to the disassociated device.

Figure 6:
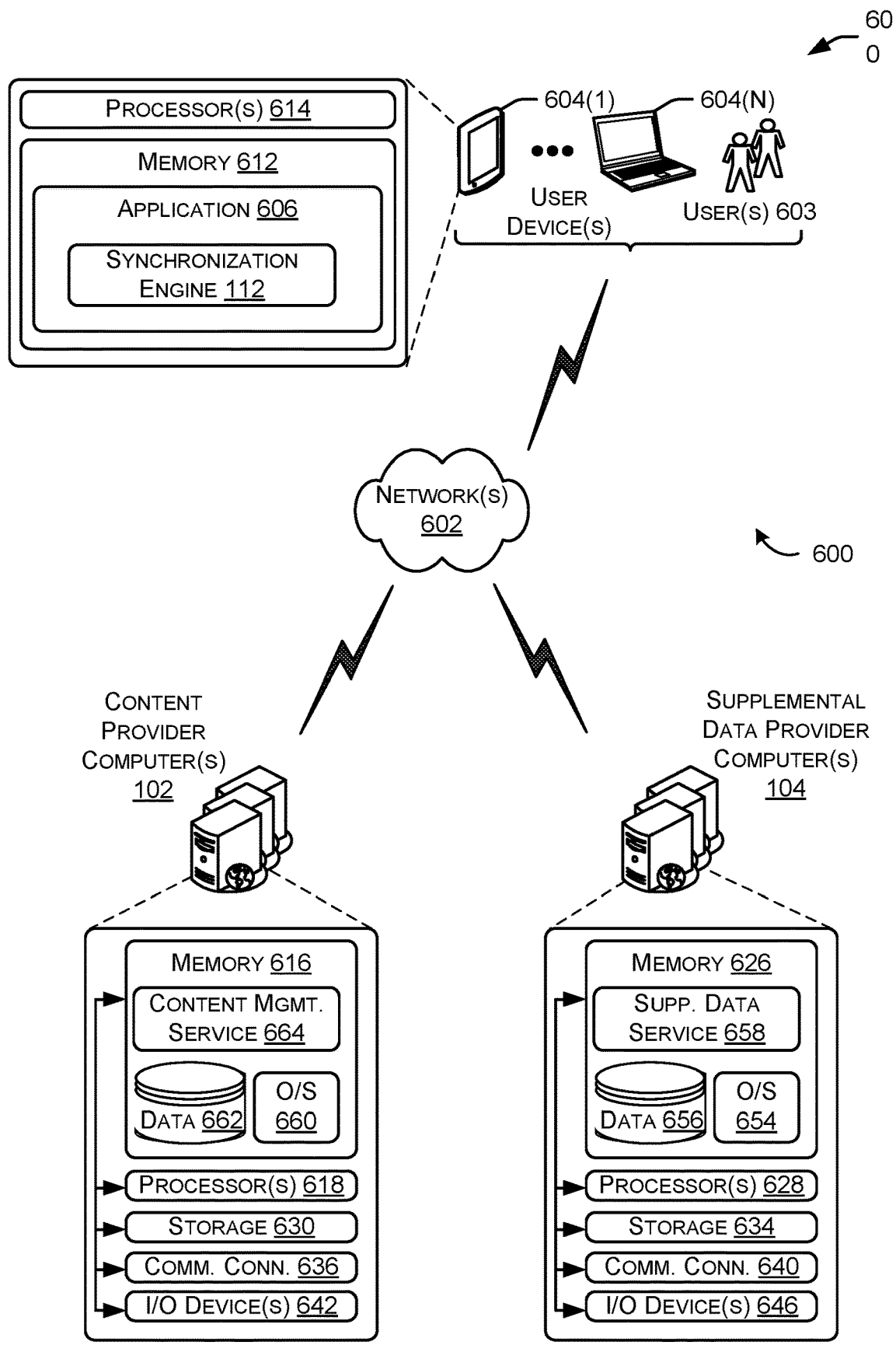
FIG. 6 is an example system for implementing aspects of the synchronization engine, in accordance with at least one embodiment.

FIG. 6 is an example system 600 for implementing aspects of the synchronization engine (e.g., the synchronization engine 112 of FIG. 1), in accordance with at least one embodiment. The system 600 may include one or more content provider computer(s) 102 and any suitable number of supplemental data provider computer(s) 104. The content provider computer(s) 102 may be configured to provide content (e.g., content 103 of FIG. 1, a media stream including audio and/or video data, etc.) to any suitable number of user device(s) 604 (e.g., the user devices 106-110 of FIG. 1). The supplemental data provider computer(s) 104 may be configured to provide supplemental data (e.g., text, audio, video, push notifications, chat messages, etc.) provided based at least in part on user input provided at any one of the user device(s) 604. In some examples, the content provider computer(s) 102 may be the same or different computers as the supplemental data provider computer(s) 104. Accordingly, in some embodiments, the content provider computer(s) 102 may facilitate providing content as well as supplemental data (e.g., a video chat by users of a group that is viewing that content) at the user device(s) 604.

The content provider computer(s) 102, supplemental data provider computer(s) 104, and the user device(s) 604 may be in communication with one another via one or more network(s) 602 (e.g., the network 114 of FIG. 1). User devices 106-110 of FIG. 1 may individually be an example of the user device(s) 604.

In some examples, the network(s) 602 may include any one or a combination of many different types of networks, such as cable networks, the Internet, wireless networks, cellular networks, and other private and/or public networks. It should be appreciated that communication between the content provider computer(s) 102, the supplemental data provider computer(s) 104, and/or the user device(s) 604 may occur over a landline phone, via a kiosk, or in any other suitable manner.

The user device(s) 604 may be any suitable type of computing device such as, but not limited to, a mobile phone, a smartphone, a personal digital assistant (PDA), a laptop computer, a desktop computer, a thin-client device, a tablet PC, an electronic book (e-book) reader, etc. In some examples, the user device(s) 604 may be in communication with the content provider computer(s) 102 and/or the supplemental data provider computer(s) 104, via the network(s) 602, or via other network connections.

In one illustrative configuration, the user device(s) 604 may include at least one memory 612 and one or more processing units (or processor(s) 614). The processor(s) 614 may be implemented as appropriate in hardware, computer-executable instructions, firmware, or combinations thereof. Computer-executable instruction or firmware implementations of the processor(s) 614 may include computer-executable or machine-executable instructions written in any suitable programming language to perform the various functions described.

The memory 612 may store program instructions that are loadable and executable on the processor(s) 614, as well as data generated during the execution of these programs. The memory 612 may include an operating system, one or more data stores, and/or one or more application programs, modules, or services for implementing the features disclosed herein including one or more features of the synchronization engine 112. Depending on the configuration and type of user computing device, the memory 612 may be volatile (such as random access memory (RAM)) and/or non-volatile (such as read-only memory (ROM), flash memory, etc.). The user device(s) 604 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 612 may include multiple different types of memory, such as static random access memory (SRAM), dynamic random access memory (DRAM), or ROM.

Turning to the contents of the memory 612 in more detail, the memory 612 may include an operating system and one or more application programs, modules, or services for implementing the features disclosed herein, such as via the application 606 and/or the synchronization engine 112 of FIG. 1.

The application 606 may be utilized by the user(s) 603 to play content provided by the content provider computer(s) 102. In some examples, the content provider computer(s) 102, perhaps arranged in a cluster of servers or as a server farm, may host the application 606 and/or cloud-based software services. Other server architectures may also be used to host the application 606 and/or cloud-based software services. The application 606 may be capable of handling requests from the user(s) 603 and serving, in response, various user interfaces that can be rendered at the user device(s) 604. For example, the application 606 can present any suitable type of website and/or interface to enable the user(s) 603 to create and/or join a group, navigate to a network page and/or interface associated with a group, select content, present the selected content, perform navigation actions within the content, modify the group members, and the like. The application 606 may further be configured to present (e.g., via a display and/or a speaker of the user device(s) 604) the supplemental data (e.g., with the content and/or to the user device(s) 604). The described techniques can similarly be implemented outside of the application 606, such as with other applications running on the user device(s) 604. In some embodiments, the synchronization engine 112 may operate as a component of the application 606 or as a standalone software and/or hardware module of the user device(s) 604.

In some aspects, the content provider computer(s) 102 and the supplemental data provider computer(s) 104 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the content provider computer(s) 102 and/or the supplemental data provider computer(s) 104 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. The content provider computer(s) 102 and/or the supplemental data provider computer(s) 104 may individually include one or more servers, perhaps arranged in a cluster, as a server farm, or as individual servers not associated with one another. These servers may be configured to implement the techniques described herein as part of an integrated computing environment.

In one illustrative configuration, the content provider computer(s) 102 may include at least one memory 616 and one or more processing units (or processor(s) 618). The supplemental data provider computer(s) 104 may include at least one memory 626 and one or more processing units (or processor(s) 628). The processor(s) 618 and 628 may be implemented as appropriate in hardware, computer-executable instructions, firmware, or combinations thereof. Computer-executable instruction or firmware implementations of the processor(s) 618 and 628 may include computer-executable or machine-executable instructions written in any suitable programming language to perform the various functions described.

Each of the memories 616 and 626 may store program instructions that are loadable and executable on the respective processors 618 and 628, as well as data generated during the execution of these programs. Depending on the configuration and type of service by the respective computers, the memories 616 and 626 may be volatile (such as RAM) and/or non-volatile (such as ROM, flash memory, etc.). The content provider computer(s) 102 and/or the supplemental data provider computer(s) 104 may also include additional storage (e.g., the storages 630 and 634), which may include removable storage and/or non-removable storage. The storages 630 and 634 may individually include, but are not limited to, magnetic storage, optical disks and/or tape storage. The disk drives and their associated computer-readable media may provide non-volatile storage of computer-readable instructions, data structures, program modules, and other data. In some implementations, the memories 616 and 626 may include multiple different types of memory, such as SRAM, DRAM, or ROM.

The memories 616 and/or 626, the storages 630 and/or 634, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory memories 616 and 626 and the storages 630 and 634 are all examples of computer storage media. Additional types of computer storage media that may be present in the content provider computer(s) 102 and/or the supplemental data provider computer(s) 104 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the respective provider computers. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The content provider computer(s) 102 may also contain communications connection(s) 636. The supplemental data provider computer(s) 104 may also contain communication connection(s) 640. The communication connection(s) 636 and/or 640 may allow the corresponding provider computer to communicate with a stored database, another computing device or server, user terminals and/or other devices on the network(s) 602. The content provider computer(s) 102 may also include I/O device(s) 642. The supplemental data provider computer(s) 104 may also include I/O device(s) 646. The I/O device(s) 642 and/or 646 may include devices such as a keyboard, a mouse, a pen, a voice input device, a touch input device, a display, speakers, a printer, etc.

Turning to the contents of the memory 626, the memory 626 may include an operating system 654, one or more data stores 656, and/or one or more application programs, modules, or services such as a supplemental data service 658. The supplemental data service 658 may be configured to provide supplemental data (e.g., text, audio, graphics, video, etc.) that may correspond to the user device(s) 604. By way of example, the supplemental data service 658 may be configured to execute a video and/or audio chat between the user device(s) 604 (or a subset of user device(s) 604, such as at least a portion of the user device(s) 604 that are associated with a group identifier).

Turning to the contents of the memory 616, the memory 616 may include an operating system 660, one or more data stores 662, and/or one or more application programs, modules, or services such as a content management service 664. The content management service 664 may be configured manage group membership (e.g., maintain group membership information) corresponding to two or more of the user device(s) 604 associated with a group identifier, provide content (e.g., content 103) to user devices associated with members of a group, authenticate a user and/or verify digital rights of one or more users to the content, facilitate navigational actions taken on one user device of a group to be replicated at other user devices of the group, and identify content index values from indications provided by the user devices of the group. The content provided by the content management service 664 may be received from another source. In some embodiments, some portion of the functionality of the content management service 664 may additionally, or alternatively, be provided by the synchronization engine 112.

In some embodiments, the synchronization engine 112 and/or the application 606 may be configured to receive/obtain content from the content management service 664 and/or supplement data from the supplemental data service 658 and provide the content and/or the supplemental data on a display and/or speaker of the user device(s) 604. The synchronization engine 112 is discussed in more detail below with respect to FIG. 7.

Figure 7:
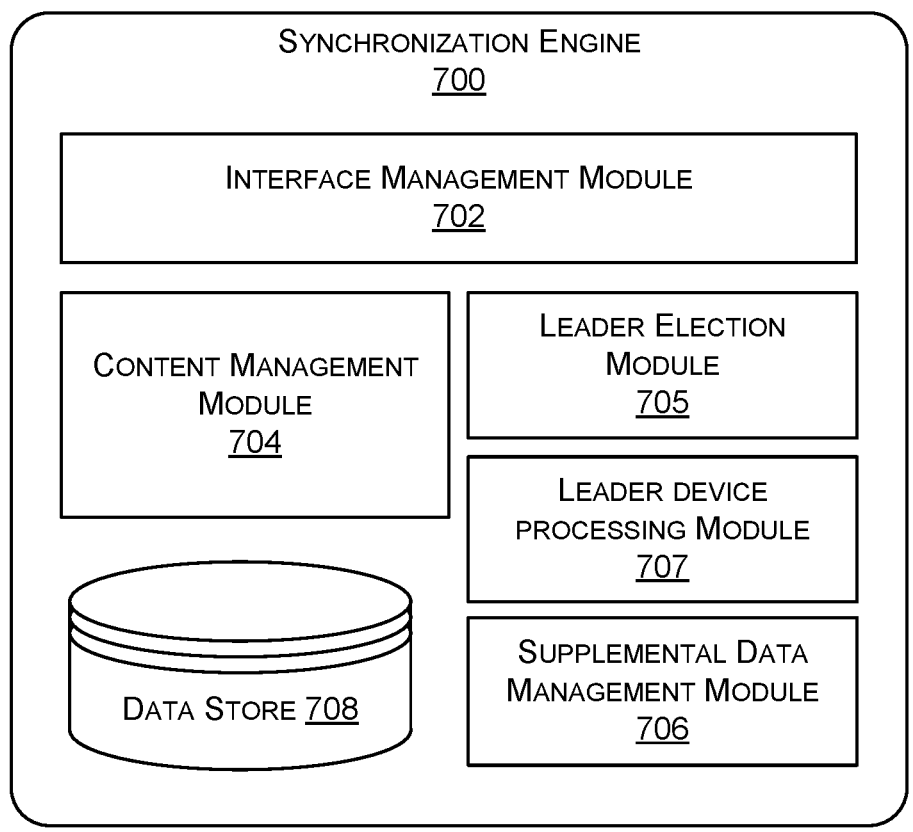
FIG. 7 illustrates in greater detail the components of an example synchronization engine, in accordance with at least one embodiment.

FIG. 7 illustrates in greater detail the components of an example synchronization engine 700 (e.g., an example of the synchronization engine 112 of FIGS. 1 and 6), in accordance with at least one embodiment. As shown, the example embodiment includes various modules including an interface management module 702, a content management module 704, a leader election module 705, a supplemental data management module 706, a leader device processing module 707, or any suitable combination of the above, although additional modules may be included within the synchronization engine 700. It should be appreciated that each module of FIG. 7 may be executed on a single computer, and or each component, or sets of components may be executed on separate computers. The synchronization engine 700 may include any appropriate combination of hardware and/or software suitable to provide the described functionality. As discussed in connection with the figures above, at least some portion of the synchronization engine 700 may be performed by the application 606 of FIG. 6. In some embodiments, the synchronization engine 700 may operate as a portion of the application 606 or a standalone hardware and/or software module separate from the application 606.

In at least one embodiment, the interface management module 702 may be configured to cause a processor to provide one or more interfaces via a computing device on which the synchronization engine 700 operates (e.g., the user devices 106-110 of FIG. 1, the user device(s) 604 of FIG. 6). One or more interfaces may be provided by the interface management module 702 may enable a user to create a group (e.g., provide a group identifier) and/or specify one or more other users of the group (e.g., utilizing email addresses, phone numbers, or the like to identify the other users). In some embodiments, the interface management module 702 may be configured to maintain a record including group membership information identifying members of the group (e.g., a mapping of a group identifier to identifiers of each of the users and/or user devices of the group). In some cases, the interface management module 702 may store the group membership information in data store 708 and/or another suitable storage location.

The interface management module 702 may further be configured to transmit the group membership information to the content provider computer(s) 102 of FIG. 6. The interface management module 702 may be configured to render one or more interfaces to enable a user of the user device to navigate to a network page associated with the group and/or to join a previously created group. In response to determining that a user has opted to join a group, the interface management module 702 may be configured to ascertain and/or retrieve device capability information (e.g., a device identifier, a processor identifier and/or a processing speed associated with the processor, an amount of random access memory of the device, a display identifier, rendering format capabilities indicating what formats are capable of being rendered at a display of the device, or the like) and/or network information (e.g., a latency metric associated with the network of the user device, a download and/or upload speed associated with a network connection utilized by the user device, etc.). In some embodiments, the interface management module 702 may be configured to store the device capability information and/or the network information within the data store 708.

In some embodiments, interface management module 702 may be configured to provide one or more interfaces to enable a user to search an electronic catalog of content hosted by the content provider computer(s) 102. User input may be received from these interfaces that indicates a selection of particular content. The interface management module 702 may be configured to receive any suitable user input from the one or more user interfaces provided. In some embodiments, the interface management module 702 may be configured to receive a request for content and may forward the request to the content management module 704. The interface management module 702 may be configured to render or otherwise present received content at the one or more user interfaces. Utilizing the user interfaces provided by the interface management module 702, a user device may be utilized to perform a navigation action (e.g., play, pause, stop, rewind, fast forward, skip, select, etc.) corresponding to content already being presented. In some embodiments, the interface management module 702 may be configured to provide one or more user interfaces to enable a user and/or user device to be disassociated from the group. If a user and/or user device is disassociated from the group, the interface management module 702 may cause the user and/or user device information to be removed/deleted from the group membership information stored in the data store 708.

The interface management module 702 may be configured to receive any suitable user input from any suitable combinations of the user interfaces provided and perform any suitable operations in response to the received user input. Generally, any data received by the interface management module 702 from the provided user interfaces may be forwarded to the content management module 704 for further processing. In some embodiments, the interface management module 702 may be configured to provide any suitable data received from the user interfaces to the content provider computer(s) 102 and/or the supplemental data provider computer(s) 104 of FIG. 6. The interface management module 702 may further be configured to receive any suitable data from the content management module 704 and/or the supplemental data management module 706 and provide this data (or a portion of this data) at one or more user interfaces managed by the interface management module 702 and provided at the user devices (e.g., the user devices of the group).

For example, the interface management module 702 may be configured to provide supplemental data (e.g., received from the supplemental data management module 706) on a display and/or a speaker of the computing device on which the synchronization engine 700 operates. In some cases, the supplemental data may be provided via a user interface that is also being utilized to provide content (e.g., content received from the content management module 704).

The content management module 704 may include computer code that, when executed by a processor, causes the processor to manage the presentation of content at the user device. In some embodiments, the content management module 704 may be configured to receive (e.g., directly and/or via the interface management module 702) user input indicating that content has been requested (e.g., a particular movie has been selected from the electronic catalog hosted by the content provider computer(s) 102). In response to the request for content, the content management module 704 may transmit a content request to the content provider computer(s) 102. In some embodiments, the content request may be formatted to include any suitable portion of the device capability information and/or the network information stored within the data store 708.

In some embodiments, the content management module 704 may be configured to receive one or more content packets from the content provider computer(s) 102. Each content packet may include a content index that indicates a sequence by which the content packets are to be provided at the user device. The content management module 704 may be configured to determine a content index value corresponding to the last content packet received that occurs latest in the sequence. Once determined, the content management module 704 may transmit the determined content index value to the content provider computer(s) 102 and/or to other user devices of the group (e.g., as identified from the group membership information stored within the data store 708). In some embodiments, the content management module 704 may be configured to store received content (e.g., one or more content packets) within the data store 708.

In some embodiments, the content management module 704 may be configured to receive one or more messages from other user devices of the group. Each of these message may include a content index value corresponding to a content packet received by a particular user device, that also occurs latest in the sequence. The content management module 704 may be configured to compare the received content index values received from the user devices in order to identify a particular content index value representing a content packet that occurs latest in the sequence that was also received by all of the user devices of the group.

In some embodiments, the content management module 704 may be configured to receive an identification of a particular content index value from the content provider computer(s) 102 and/or from another user device (e.g., a leader device). In some embodiments, the particular content index value received may correspond to a content index occurring latest in the sequence which corresponds to a content packet that was received by all of the user devices of the group (e.g., as determined by the content provider computer(s) 102).

In some embodiments, the content management module 704 may be configured to provide a portion of content (e.g., some portion of the data of a content packet) to the interface management module 702 to be presented at the user device (e.g., via a display and/or a speaker of the user device). In some embodiments, the content management module 704 may provide the portions of content based at least in part on the content index value determined by the content management module 704, determined by a leader device, or determined by the user device on which the synchronization engine 700 operates. By way of example, a content index of "32" may be determined utilizing messages provided by other user devices in the group and a last content packet received by the user device, or by receiving the content index of "32" from the content provider computer(s) 102 and/or a leader device. Accordingly, the content management module 704 may sequentially provide received content packets having an index value equal to, or occurring earlier in the sequence, to the interface management module 702. The content management module 704 may be configure to ensure that no content packet is presented at the user device having a content index occurring later in the sequence than "32."

In some embodiments, the content management module 704 may be configured to determine that the user device has cause playback delay within the group. In some embodiments, the content management module 704 may identify this delay based at least in part on content indices received from other user devices and/or by receiving a corresponding indication from the content provider computer(s) 102 and/or a leader device. In some embodiments, the content management module 704 may transmit a content format change request (e.g., to the content provider computer(s) 102 and/or the leader device) in order to effectuate a format change of the content packets provided to the user device. In some embodiments, the content management module 704 may cause content requests provided to a content provider (e.g., the content provider computer(s) 102, the other user devices of the group, the leader device, etc.) to include an indication of the format requested. In some embodiments, different formats of the content may already be available (e.g., stored in the data store 708 after receipt from the content provider computer(s) 102 or other user devices of the group). In this scenario, the content management module 704 may be configured to cause a different format (e.g., a lower resolution format) to be selected and previously received content packets corresponding to the different format to be utilized for playback.

In some embodiments, the content management module 704 may be configured to cause a user device to be disassociated from the content group. In some embodiments, the content management module 704 may receive an indication that a user device is to be disassociated with the group from any suitable user device of the group. The content management module 704 may be configured to update group membership information stored within data store 708 and/or transmit data to cause another component (e.g., the content provider computer(s) 102 and/or a leader device and/or other user devices of the group) to remove the identified user device from the group (e.g., by deleting a respective user device identifier from the group membership information maintained by the content provider computer(s) 102 and/or by the leader device and/or by the other user devices of the group).

In some embodiments, the content management module 704 may be configured to suspend playback at a user device. By way of example, the content management module 704 may be configured to receive an indication (e.g., via an interface provided by the interface management module 702) an indication that a user device on which the synchronization engine 700 is operating, is to suspend playback. In response to receiving this indication, the content management module 704 may be configured to cease processing content packets and/or to cease transmission of a last content packet received. The content management module 704 may further be configured to receive an indication that playback is to resume from a suspended state. Upon receiving an indication that playback is to resume, the content management module 704 may be configured to resume processing content packets and/or to request from a streaming device (e.g., the content provider computer(s) 102, a leader device, another user device of the group) that content streaming resume. Upon resuming playback, the content management module 704 may be configured to once again transmit a context index of the last content packet received.

In some embodiments, the leader election module 705 may be configured to perform any suitable process for electing a leader device from the user devices of the group. In some embodiments, the leader election module 705 may transmit and/or receive any suitable messages from one or more other user devices of the group. The leader election module 705 may perform any suitable operation associated with a predefined leader election algorithm (e.g., a bully election algorithm, improved bully election algorithm, a modified bully election algorithm, a ring election algorithm, a modified ring election algorithm, or the like). The leader election module 705 may invoke any suitable functionality of the leader device processing module 707 upon determining that the user device has been elected as the leader device for the group.

In some embodiments, the leader device processing module 707 may be configured to perform any suitable functionality discussed above with respect to a leader device. By way of example, the leader device processing module 707 may be configured to receive distribution data from the content provider computer(s) 102 indicating particular portions of content that have been distributed to and/or stored by particular user devices of the group. The leader device processing module 707 may store the distribution data within the data store 708 upon receive, or at any suitable time. In some embodiments, a request for content may be received from one or more user devices of the group. The leader device processing module 707 may maintain a running index indicating a current point in playback of the content. Based at least in part on this running index and the receipt of a request for content, the leader device processing module 707 may be configured to identify (e.g., from the distribution data stored in data store 708) a storage location (e.g., a user device of the group) from which content packets are to be requested. The leader device processing module 707 may transmit a message containing the identified storage location to each of the requesting user devices of the group.

In some embodiments, the leader device processing module 707 may be configured to receive messages from the user devices of the group, each message indicating a content index corresponding to a last content packet received by a respective user device. In some embodiments, the leader device processing module 707 may be configured to compare the content indices received (and, in some cases, a content index of the last content packet received by the leader device) to identify which content index corresponds to a content packet received by all of the user devices of the group, that also occurs latest in the sequence. The leader device processing module 707 may be further configured to transmit a message to all and/or to each of the user devices of the group indicating the content index identified such that the synchronization engines operating on each device may make determinations regarding playback of the content based at least in part on the content index identified.

In some embodiments, the leader device processing module 707 may be configured to maintain formatting information corresponding to a format of the content currently being provided to each of the user devices of the group. In some embodiments, this formatting information may be stored as part of the group membership information within data store 708. It should be appreciated that the format of the content provided to each user device of the group may vary (e.g., based at least in part on the device capabilities of each user device and/or the network capabilities of the network connection utilized by the respective user devices).

In some embodiments, the leader device processing module 707 may be configured to identify when a particular user device has lagged behind other user devices of the group with respect to playback of the content. The leader device processing module 707 may identify that the particular user device has caused playback delay at least one other user device of the group over a threshold number of times and/or that the playback delay has exceeds a threshold amount of time. In some embodiments, the leader device processing module 707 may be configured to identify that the format of the content provided to the user device is to be modified. For example, the leader device processing module 707 may utilize a predetermined protocol set to identify a different format for content to be provided to the user device (e.g., SD instead of HD, HD instead of 4K, etc.). In other words, the leader device processing module 707 may determine that the quality (e.g., resolution quality) of the content played at the user device should be degraded such that the user device may be more likely to process the content in the degraded format more quickly. Accordingly, the leader device processing module 707 may transmit a request (e.g., to the content provider computer(s) 102) to request content in the degraded format be distributed (e.g., to the leader user device, to one or more user devices of the group, to the particular user device, etc.). It should be appreciated that any of the functionality discussed above with respect to the leader device processing module 707 may be, at least in part, performed by the content provider computer(s) 102.

The supplemental data management module 706 may include computer code that, when executed by a processor, causes the processor to manage the presentation of supplemental data at the user device. In some embodiments, the supplemental data management module 706 may be configured to receive audio and/or video data from the user device and transmit such data (e.g., supplemental data) to other user devices in the group (e.g., via the supplemental data provider computer(s) 104). The supplemental data management module 706 may be configured to provide received supplemental data to the interface management module 702 for presentation at an interface provided by the interface management module 702. The supplemental data management module 706 may further be configured to provide the supplemental data (e.g., audio and/or video) to a hardware component (e.g., a display and/or a speaker) of the user device.

Figure 8:
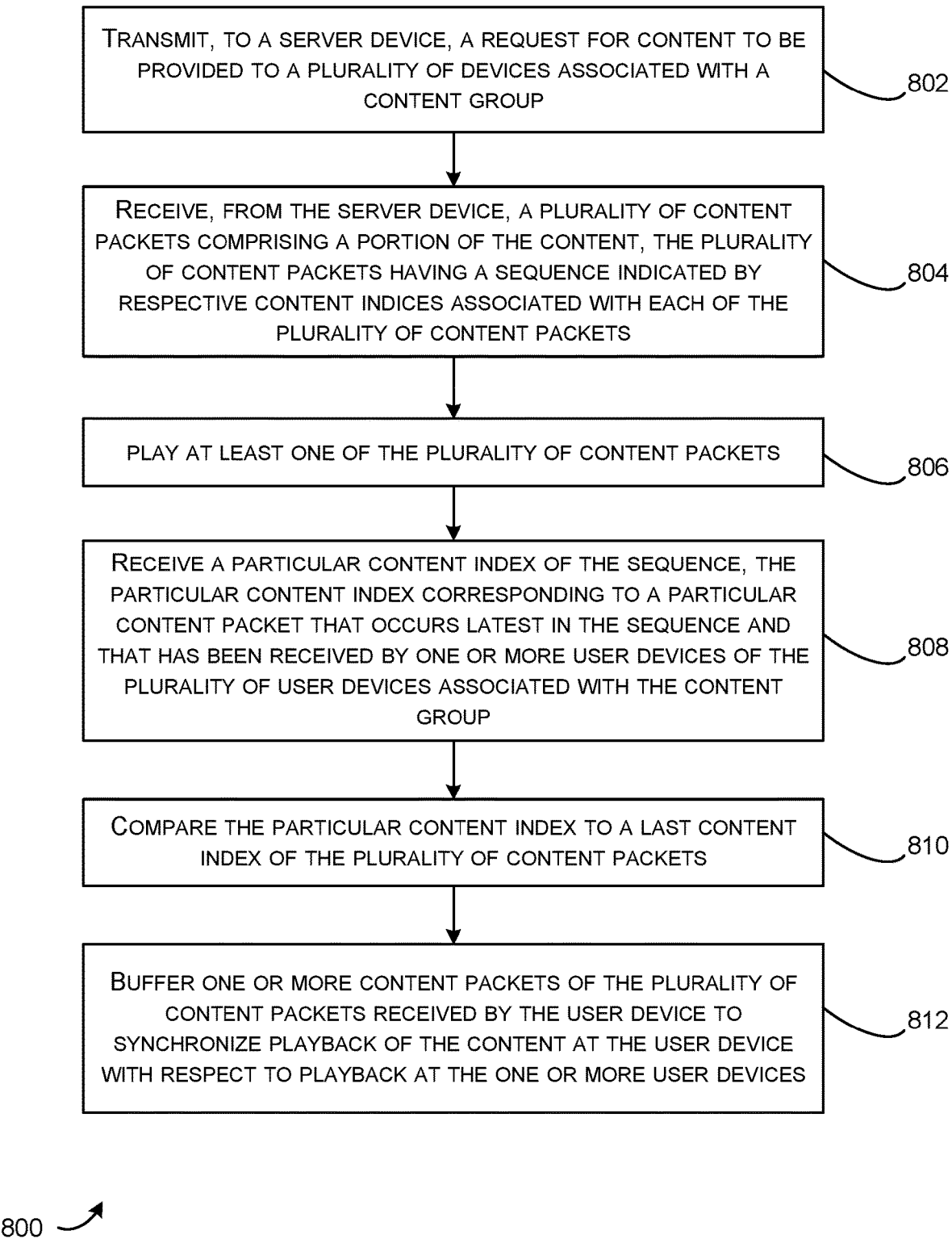
FIG. 8 is a flowchart illustrating an example method for synchronizing content utilizing the synchronization engine, in accordance with at least one embodiment.

FIG. 8 is a flowchart illustrating an example method 800 for synchronizing content utilizing the synchronization engine, in accordance with at least one embodiment. The method 800 may be performed by one or more components of the synchronization engine 112 of FIGS. 1, 6, and 7. The method 800 may performed in any suitable order. It should be appreciated that the method 800 may include a greater number or a lesser number of steps than that depicted in FIG. 8.

The method may begin at 802, a request for content to be provided to a plurality of devices associated with a content group may be transmitted (e.g., by the interface management module 702) to a server device (e.g., the content provider computer(s) 102 of FIGS. 1 and 6).

At 804, a plurality of content packets comprising a portion of the content may be received from the server device. In some embodiments, the plurality of content packets may have a sequence indicated by respective content indices associated with each of the plurality of content packets.

At 806, at least one of the plurality of content packets may be played (e.g., at the user device on which the synchronization engine 700 operates). By way of example, playback may utilize a display and/or speaker of the user device.

At 808, a particular content index of the sequence may be received (e.g., from the content provider computer(s) 102 via the content management module 704). In some embodiments, the particular content index may correspond to a particular content packet that occurs latest in the sequence and that has been received by one or more user devices of the plurality of user devices associated with the content group.

At 810, the particular content index may be compared (e.g., by the content management module 704) to a last content index of the plurality of content packets received by the user device.

At 812, one or more content packets of the plurality of content packets received by the user device may be buffered (e.g., stored in a buffer but not displayed at the user device) to synchronize playback of the content at the user device with respect to playback at the one or more user devices.

FIG. 9 is a flowchart illustrating another example method 900 for synchronizing content utilizing the synchronization engine (e.g., the synchronization engine 700 of FIG. 7), in accordance with at least one embodiment. The method 900 may be performed by a synchronization engine operating on a user device. A computer-readable storage medium may store computer-readable instructions that, upon execution by one or more processors of a user device, may cause the user device to perform the operations of the method 900. The method 900 may performed in any suitable order. It should be appreciated that the method 900 may include a greater number or a lesser number of steps than that depicted in FIG. 9.

The method may begin at 902, where request for content to be provided to a plurality of devices associated with a content group may be transmitted (e.g., by the interface management module 702) to a server device (e.g., the content provider computer(s) 102 of FIGS. 1 and 6). In some embodiments, the content group may comprise the user device on which the synchronization engine operates.

At 904, a plurality of content packets comprising a portion of the content may be received from the server device. In some embodiments, the plurality of content packets may have a sequence indicated by respective content indices associated with each of the plurality of content packets.

At 906, at least one of the plurality of content packets may be played (e.g., at the user device on which the synchronization engine 700 operates). By way of example, playback may utilize a display and/or speaker of the user device.

At 908, a particular content index of the sequence may be received (e.g., from the content provider computer(s) 102 via the content management module 704). In some embodiments, the particular content index may correspond to a particular content packet that occurs latest in the sequence and that has been received by one or more user devices of the plurality of user devices associated with the content group.

At 910, playback of one or more content packets of the plurality of content packets received by the user device may be modified (e.g., by the content management module 704) to synchronize playback of the content at the user device with respect to playback at the one or more devices.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk®. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response requests from user devices, such as by executing one or more Web applications that may be implemented as one or more scripts or programs written in any programming language, such as Java °, C, C#or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method performed by a user device, comprising:
    providing a user interface associated with a content group;
    receiving user input at the user interface;
    in response to receiving the user input, associating the user device with the content group, the content group being associated with a plurality of user devices comprising the user device;
    executing, by the user device, a leader election process, wherein executing the leader election process elects a leader device from among the plurality of user devices of the content group;

receiving, from a server device, two or more content packets comprising a portion of content that is to be played synchronously at the plurality of user devices, the content comprising a plurality of content packets having a sequence indicated by respective content indices associated with each of the plurality of content packets, each of the plurality of user devices receiving from the server device a respective portion of the content that differs from respective portions of the content provided to other user devices of the content group;

receiving a specific content packet of the content from another user device of the content group;

receiving, from the leader device, a particular content index of the sequence, the particular content index corresponding to a particular content packet that occurs latest in the sequence and that has been received by each of the plurality of user devices in the content group; and delaying playback of the specific content packet to synchronize playback of the content at the plurality of user devices of the content group, the playback of the specific content packet being delayed based at least in part on the particular content index.

2. The computer-implemented method of claim 1, further comprising transmitting, to the leader device, a last content index corresponding to the last content packet played by the user device, wherein the particular content index is identified by the leader device based at least in part on transmitting the last content index to the leader device.

3. The computer-implemented method of claim 1, wherein the server device is selected from a plurality of server devices based at least in part on a first distance between the server device and the user device and a second distance between the server device and at least one other user device of the content group.

4. The computer-implemented method of claim 1, further comprising:

transmitting, to the server device, the last content index corresponding to a last content packet played by the user device;

comparing the particular content index to the last content index, wherein the playback of the specific content packet is delayed based at least in part on determining the last content index is associated with a content index that occurs later in the sequence than the particular content index.

5. A system, comprising:

a server device;

a user device of a plurality of user devices associated with a content group, the user device comprising:

one or more processors; and one or more memories configured with computer-executable instructions that, when executed by the one or more processors, cause the user device to:

execute operations of an election process to elect a leader device from among the plurality of user devices of the content group;

receive, from the server device, a set of content packets comprising a portion of content that is to be played synchronously at the plurality of user devices, the content comprising a plurality of content packets having a sequence indicated by respective content indices associated with each of the plurality of content packets, at least one other user device of the content group receiving from the server device a respective portion of the content that differs from respective portions of the content provided to other user devices of the content group;

receive a specific content packet of the content from another user device of the content group;

obtain a particular content index of the sequence, the particular content index corresponding to a particular content packet that occurs latest in the sequence and that has been received by each of the plurality of user devices associated with the content group;

and delay playback of to synchronize playback of the content at the plurality of user devices of the content group, the playback of the specific content packet being delayed based at least in part on the particular content index obtained.

6. The system of claim 5, wherein executing the computer-executable instructions further causes the user device to:

transmit, to the leader device, an identifier for a last content packet played at the user device, the leader device being configured to identify the particular content packet that occurs latest in the sequence and that has been received by one or more user devices of the plurality of user devices associated with the content group, the leader device identifying the particular content packet based at least in part on the identifier for the last content packet played at the user device.

7. The system of claim 5, wherein executing the computer-executable instructions further causes the user device to:

identify, by the user device, that the user device has been elected as the leader device;

maintain, by the user device operating as the leader device, associations between a plurality of content portion locations at which the respective portions of the content are stored, the plurality of content portion locations corresponding to a particular user device of the plurality of user devices;

receive a content request from at least one user device of the plurality of user devices;

identify, based at least in part on the associations maintained, a specific user device of the plurality of user devices is storing a particular content packet corresponding to the content request; and transmit, to the at least one user device, an identifier for the specific user device, wherein transmitting causes the at least one user device to request at least the particular content packet from the specific user device storing the particular content packet.

8. The system of claim 5, wherein the particular content index of the sequence is obtained from the leader device.

9. The system of claim 5, wherein the particular content index of the sequence is obtained from a particular user device of the plurality of user devices.

10. The system of claim 5, wherein the playback of the specific content packet is delayed based at least in part on determining that the particular content index corresponds to a first portion of content that occurs earlier in the content than a second portion of content that corresponds to the last content index.

11. The system of claim 5, wherein executing the computer-executable instructions further causes the user device to:

transmit playback data comprising at least one of: a set of capabilities associated with the user device, a current bandwidth, a current playback resolution, a current run time of the content, or the last content index corresponding to a last content packet received of the plurality of content packets.

12. The system of claim 5, wherein executing the computer-executable instructions further causes the user device to:

receive, from another user device of the plurality of user devices, a subsequent plurality of content packets, the subsequent plurality of content packets being associated with a first format that is different from a second format associated with the plurality of content packets originally received; and play at least one of the subsequent plurality of content packets.

13. The system of claim 5, wherein executing the computer-executable instructions further causes the user device to:

display a notification indicating a reason associated with delaying the playback;

obtain a subsequent content index of the sequence, the subsequent content index corresponding to a subsequent content packet that has been received by the plurality of user devices associated with the content group;

compare the subsequent content index to the last content index of the plurality of content packets; and play the specific content packet that was originally delayed based at least in part on comparing the subsequent content index to the last content index.

14. A computer-readable storage medium comprising computer-readable instructions that, upon execution by one or more processors of a user device, cause the one or more processors to perform operations comprising:

receiving, by the user device of a content group comprising a plurality of user devices, a plurality of content packets corresponding to a portion of content that is to be played synchronously at the plurality of user devices, each of the plurality of user devices storing respective portions of the content, each respective portion differing from other respective portions of the content stored at other user devices of the content group, the content comprising content packets having a sequence indicated by respective content indices associated with each of the plurality of content packets;

receiving a specific content packet of the content from another user device of the content group;

determining a last content index corresponding to a last content packet played at the user device;

receiving a particular content index of the sequence, the particular content index corresponding to a particular content packet that occurs latest in the sequence and that has been received by each of the plurality of user devices associated with the content group; and delaying, based at least in part on the particular content index, playback of the specific content packet to synchronize playback of the content at the plurality of user devices.

15. The computer-readable storage medium of claim 14, wherein executing the computer-readable instructions causes the one or more processors to perform further operations comprising:

receiving an indication that another device of the plurality of user devices has paused playback of the content; and pausing playback at the user device in response to receiving the indication.

16. The computer-readable storage medium of claim 14, wherein executing the computer-readable instructions causes the one or more processors to perform further operations comprising:

transmitting, via a user interface, first data that causes the user device to be associated with the content group;

receiving user input indicating a desire to disassociate, from the content group, at least one user device of the plurality of user devices; and transmitting second data that causes the at least one user device to be disassociated with the content group.

17. The computer-readable storage medium of claim 14, wherein executing the computer-readable instructions causes the one or more processors to perform further operations comprising:

receiving user input indicating a desire to suspend the playback at the user device, wherein receiving the user input causes the user device to suspend the playback of the content, and wherein receiving the user input causes the user device to refrain from transmitting a subsequent last packet identifier index until additional user input is received indicating a desire to resume the playback.

18. The computer-readable storage medium of claim 14, wherein executing the computer-readable instructions causes the one or more processors to perform further operations comprising:

in response to receiving additional user input, determining a subsequent content index associated with playback of the content at other devices of the plurality of user devices; and playing the specific content packet based at least in part on the subsequent content index.

19. The computer-readable storage medium of claim 14, wherein executing the computer-readable instructions causes the one or more processors to perform further operations comprising:

receiving, by the user device, a set of messages from respective devices of the content group, each message of the set of messages comprising a respective last packet index corresponding to a last packet received by each of the respective devices of the content group; and identifying the particular content index based at least in part on comparing the last content index corresponding to the last content packet played at the user device to the respective last packet index received in each of the set of messages from respective devices of the content group.

20. The computer-readable storage medium of claim 14, wherein executing the computer-readable instructions causes the one or more processors to perform further operations comprising receiving, from a second user device of the content group, an additional content packet, the additional content packet having a different resolution quality from a resolution quality of the specific content packet.

* * * * *

UNITED STATES PATENT AND TRADEMARK OFFICE
CERTIFICATE OF CORRECTION

Page 1 of 1

PATENT NO. : 11,089,352 B1
APPLICATION NO. : 16/259881
DATED : August 10, 2021
INVENTOR(S) : Michael James Bartholomew, Paul Martin and Steve Huynh It is certified that error appears in the above-identified patent and that said Letters Patent is hereby corrected as shown below:

In the Claims

Column 36, Line 13, Claim 5:
Delete: "delay playback of to synchronize playback of the"
Insert: --delay playback to synchronize playback of the--

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*